US010965157B2

(12) United States Patent
Lee et al.

(10) Patent No.: US 10,965,157 B2
(45) Date of Patent: Mar. 30, 2021

(54) ELECTRONIC DEVICE HAVING A PLURALITY OF STACKED COIL ANTENNAS

(71) Applicant: Samsung Electronics Co., Ltd., Gyeonggi-do (KR)

(72) Inventors: Sungmin Lee, Gyeonggi-do (KR); Seongyeol Kim, Gyeonggi-do (KR); Jaewoong Lee, Gyeonggi-do (KR); Yujin Jeong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/527,853

(22) Filed: Jul. 31, 2019

(65) Prior Publication Data

US 2020/0044484 A1 Feb. 6, 2020

(30) Foreign Application Priority Data

Jul. 31, 2018 (KR) .................. 10-2018-0089604

(51) Int. Cl.
*H02J 50/10* (2016.01)
*H01Q 7/00* (2006.01)
*H02J 50/70* (2016.01)
*H02J 50/40* (2016.01)

(52) U.S. Cl.
CPC ............ *H02J 50/10* (2016.02); *H01Q 7/005* (2013.01); *H02J 50/40* (2016.02); *H02J 50/70* (2016.02)

(58) Field of Classification Search
CPC ........... H02J 50/10; H02J 50/40; H02J 50/70; H01Q 7/005; H01Q 7/00
See application file for complete search history.

(56) References Cited

U.S. PATENT DOCUMENTS

| 2003/0107523 | A1 | 6/2003 | Yahata et al. |
| 2013/0176179 | A1 | 7/2013 | Park |
| 2014/0184462 | A1 | 7/2014 | Yosui |
| 2017/0237149 | A1 | 8/2017 | Lee et al. |
| 2018/0040950 | A1* | 2/2018 | Lee ................... H04B 5/0031 |

FOREIGN PATENT DOCUMENTS

KR 101823300 1/2018

OTHER PUBLICATIONS

International Search Report dated Nov. 8, 2019 issued in counterpart application No. PCT/KR2019/009473, 3 pages.

* cited by examiner

*Primary Examiner* — Robert L Deberadinis
(74) *Attorney, Agent, or Firm* — The Farrell Law Firm, P.C.

(57) ABSTRACT

An electronic device is provided. The electronic device includes a housing including a first surface facing in a first direction, a second surface facing in a second direction opposite to the first direction, and a side surface enclosing a space between the first surface and the second surface, a display exposed at least partially through the first surface, a first conductive coil positioned inside the housing, positioned above the display when viewed from above the second surface, and having an axis substantially perpendicular to the first direction or the second direction, and a second conductive coil and a third conductive coil positioned inside the housing, positioned above the first conductive coil when viewed from above the second surface, and having an axis substantially horizontal to the first direction or the second direction.

19 Claims, 14 Drawing Sheets

ELECTRONIC DEVICE HAVING A PLURALITY OF STACKED COIL ANTENNAS

CROSS-REFERENCE TO RELATED APPLICATION(S)

This application is based on and claims priority under 35 U.S.C. § 119 to Korean Patent Application Serial No. 10-2018-0089604, filed on Jul. 31, 2018, in the Korean Intellectual Property Office, the entire disclosure of which is incorporated herein by reference.

BACKGROUND

1. Field

The present disclosure relates generally to an electronic device for performing short range wireless communication, electronic payment, or wireless transmission and reception.

2. Description of Related Art

In general, with the spread of mobile electronic devices (e.g., smartphones), mobile electronic devices (e.g., smartphones) are used in various fields and there has been a spotlight on, for example, near field communication (NFC), magnetic secure transmission (MST), and wireless charging technology. When the NFC, MST, and wireless charging technology are applied to electronic devices, the electronic devices may be used for uses such as transportation fare payment, credit card payment, electronic bank account, copyright management, identification, and wireless charging using a wireless charging pad as well as basic functions such as a call, video/music reproduction, and navigation guidance that are available in conventional electronic devices.

Electronic devices may need to secure a radiation performance of antennas while receiving the antennas for NFC, MST, and wireless charging in a limited space therein.

SUMMARY

The present disclosure has been made to address at least the disadvantages described above and to provide at least the advantages described below.

In accordance with an aspect of the present disclosure, an electronic device is provided. The electronic device includes a housing including a first surface facing in a first direction, a second surface facing in a second direction opposite to the first direction, and a side surface enclosing a space between the first surface and the second surface, a display exposed at least partially through the first surface, a first conductive coil positioned inside the housing, positioned above the display when viewed from above the second surface, and having an axis substantially perpendicular to the first direction or the second direction, a second conductive coil and a third conductive coil positioned inside the housing, positioned above the first conductive coil when viewed from above the second surface, and having an axis substantially horizontal to the first direction or the second direction, a first wireless communication circuit positioned inside the housing, electrically connected to the first conductive coil and the second conductive coil, and in which the first conductive coil and the second conductive coil are configured to generate a first magnetic signal, a wireless charging circuit positioned inside the housing, electrically connected to the second conductive coil, and in which the second conductive coil is configured to generate or receive a second magnetic signal, and a second wireless communication circuit positioned inside the housing, electrically connected to the third conductive coil, and in which the third conductive coil is configured to generate or receive a third magnetic signal.

In accordance with an aspect of the present disclosure, an electronic device is provided. The electronic device includes a housing including a first surface facing in a first direction, a second surface facing in a second direction opposite to the first direction, and a side surface enclosing a space between the first surface and the second surface, a display at least partially exposed through the first surface, a flexible printed circuit board (FPCB) positioned inside the housing, positioned above the display when viewed from above the second surface, and including a first conductive coil and a second conductive coil, a wireless communication circuit positioned inside the housing, electrically connected to the first conductive coil and the second conductive coil, and in which the first conductive coil and the second conductive coil are configured to generate a first magnetic signal, and a wireless charging circuit positioned inside the housing, electrically connected to the second conductive coil, and in which the second conductive coil is configured to generate or receive a second magnetic signal. The FPCB includes an upper layer and a lower layer positioned below the upper layer when viewed from above the second surface, the second conductive coil is formed in the upper layer, and the first conductive coil is formed in the lower layer.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
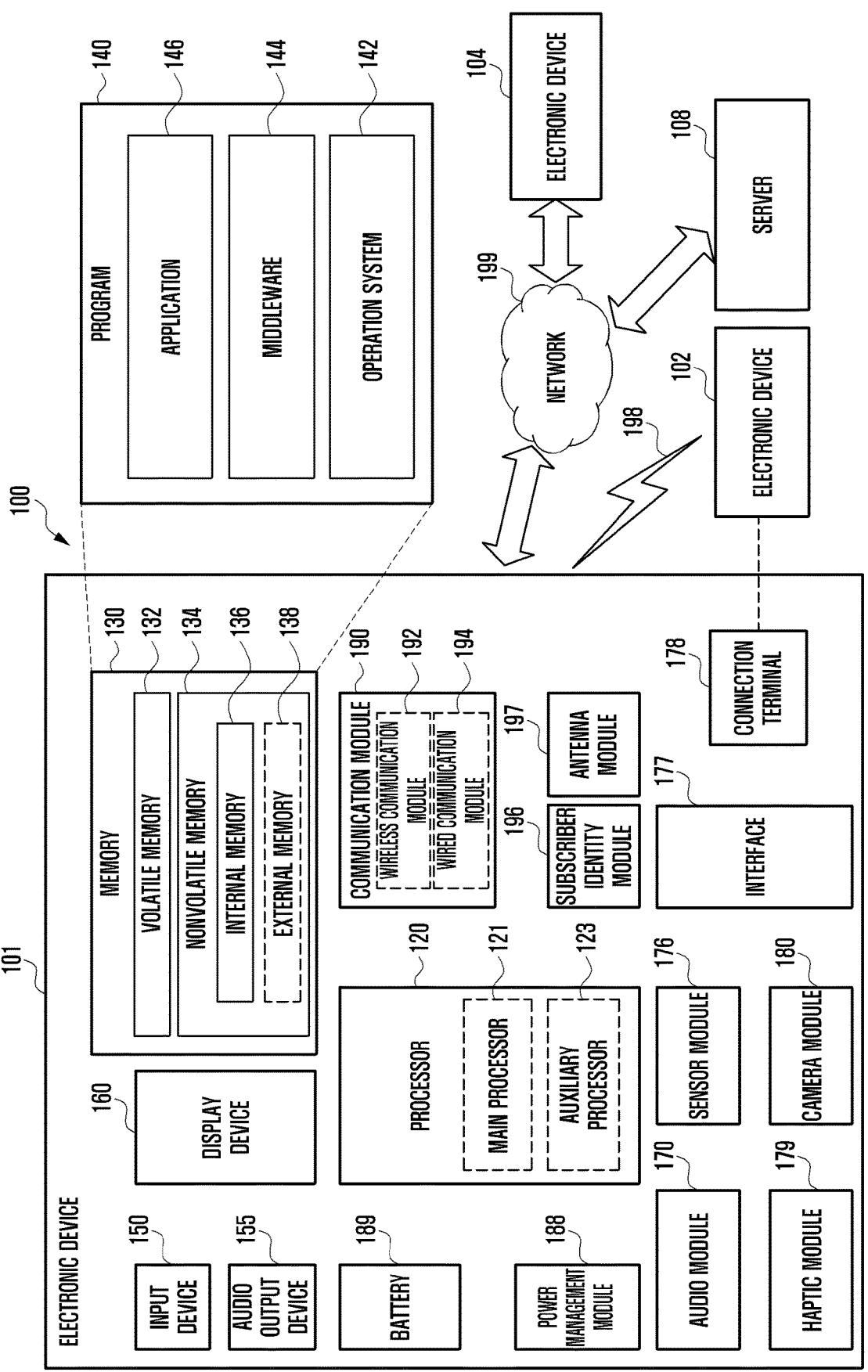
FIG. 1 is a diagram of a configuration of an electronic device in a network environment, according to an embodiment.

FIG. 1 is a block diagram illustrating an electronic device 101 in a network environment 100 according to embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
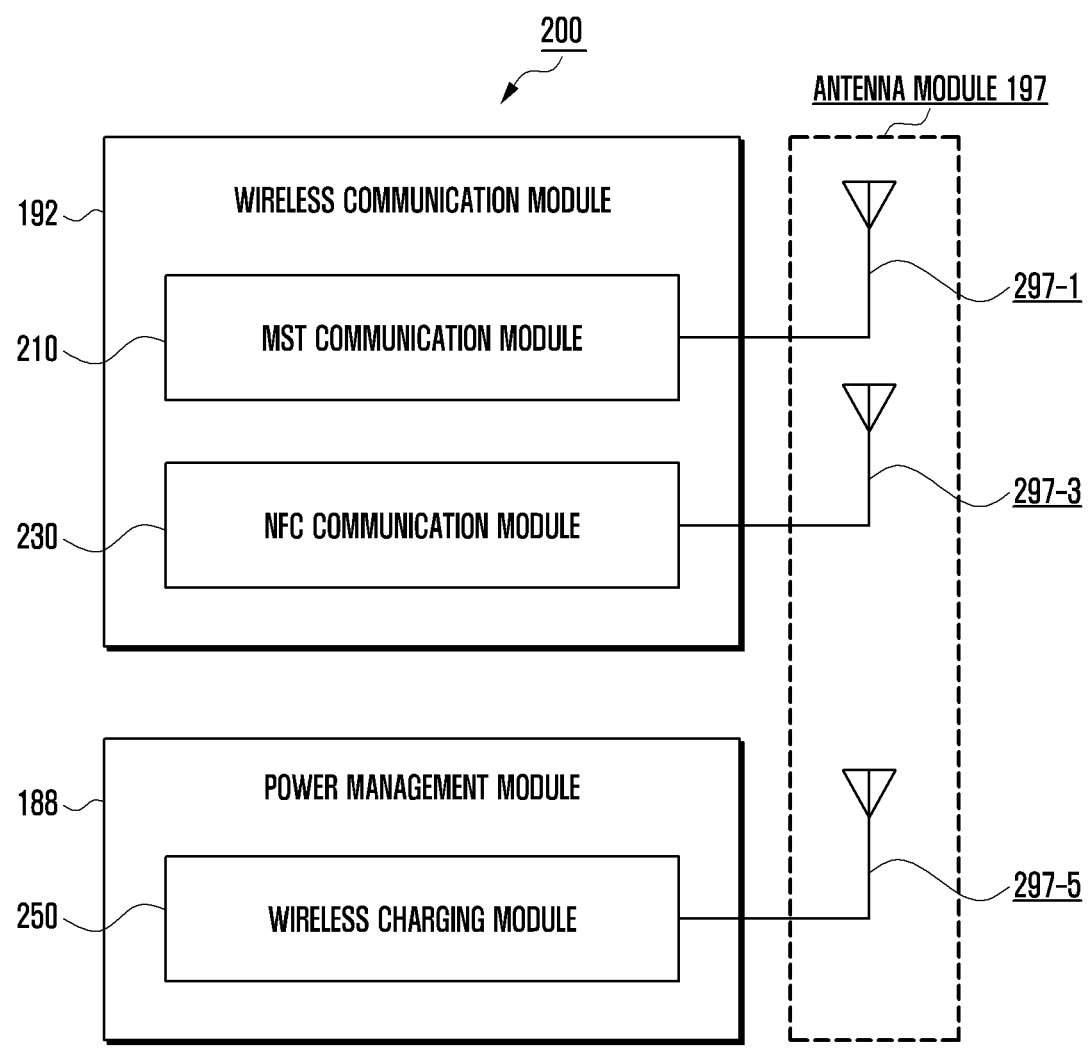
FIG. 2 is a diagram of a wireless communication module, a power management module, and an antenna module of an electronic device, according to an embodiment.

FIG. 2 is a diagram 200 of the wireless communication module 192, the power management module 188, and the antenna module 197 of the electronic device 101, according to an embodiment. Referring to FIG. 2, the wireless communication module 192 may include an MST communication module 210 or an NFC module 230, and the power management module 188 may include a wireless charging module 250. In such a case, the antenna module 197 may include a plurality of antennas that include an MST antenna 297-1 connected with the MST communication module 210, an NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, the MST communication module 210 may include a switching module that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. Payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. The NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including a magnetic resonance scheme or a magnetic induction scheme.

Some of the MST antenna 297-1, the NFC antenna 297-3, or the wireless charging antenna 297-5 may share at least part of their radiators. The radiator of the MST antenna 297-1 may be used as the radiator of the NFC antenna 297-3 or the wireless charging antenna 297-5, or vice versa. In such a case, the antenna module 197 may include a switching circuit adapted to selectively connect (e.g., close) or disconnect (e.g. open) at least part of the antennas 297-1, 297-3, or 297-5 under the control of the wireless communication module 192 (e.g., the MST communication module 210 or the NFC communication module 230) or the power management module (e.g., the wireless charging module 250). When the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

At least one function of the MST communication module 210, the NFC communication module 230, or the wireless charging module 250 may be controlled by an external processor (e.g., the processor 120). At least one specified function (e.g., a payment function) of the MST communication module 210 or the NFC communication module 230 may be performed in a trusted execution environment (TEE). The TEE may form an execution environment in which at least some designated area of the memory 130 is allocated to be used for performing a function (e.g., a financial transaction or personal information-related function) that requires a relatively high level of security. In such a case, access to the at least some designated area of the memory 130 may be restrictively permitted according to an entity accessing thereto or an application being executed in the TEE.

Figure 3A:
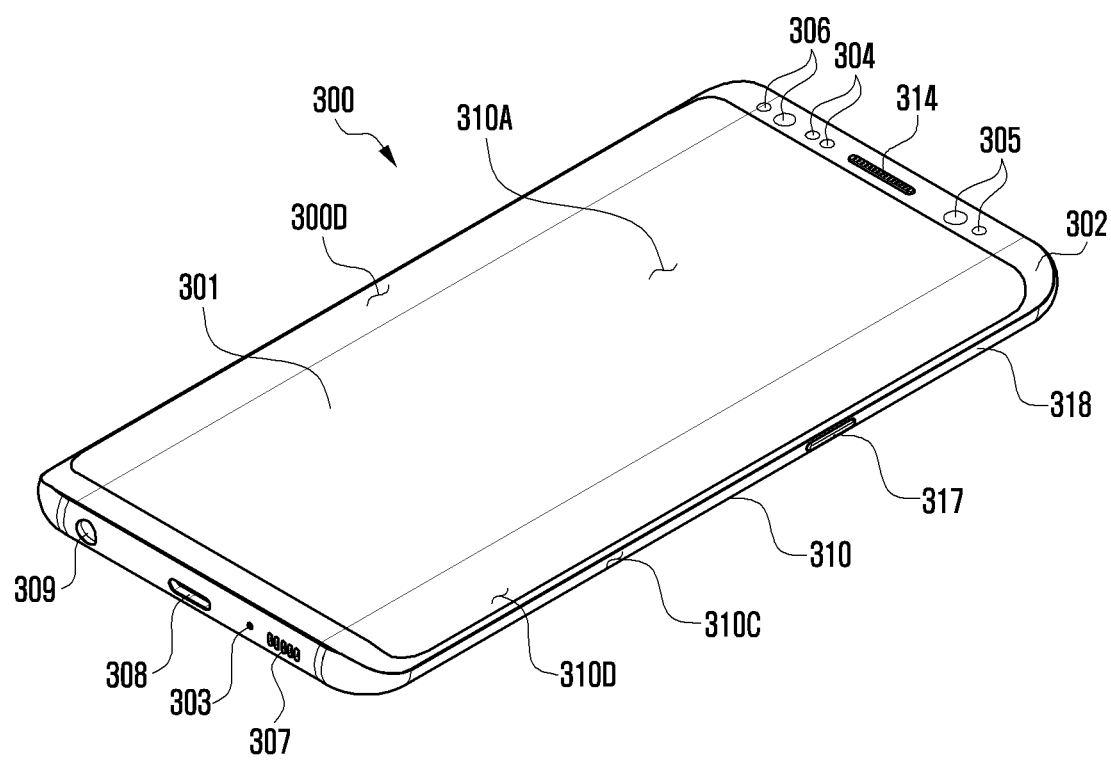
FIG. 3A is a diagram of a front surface of a mobile electronic device, according to an embodiment.
Figure 3B:
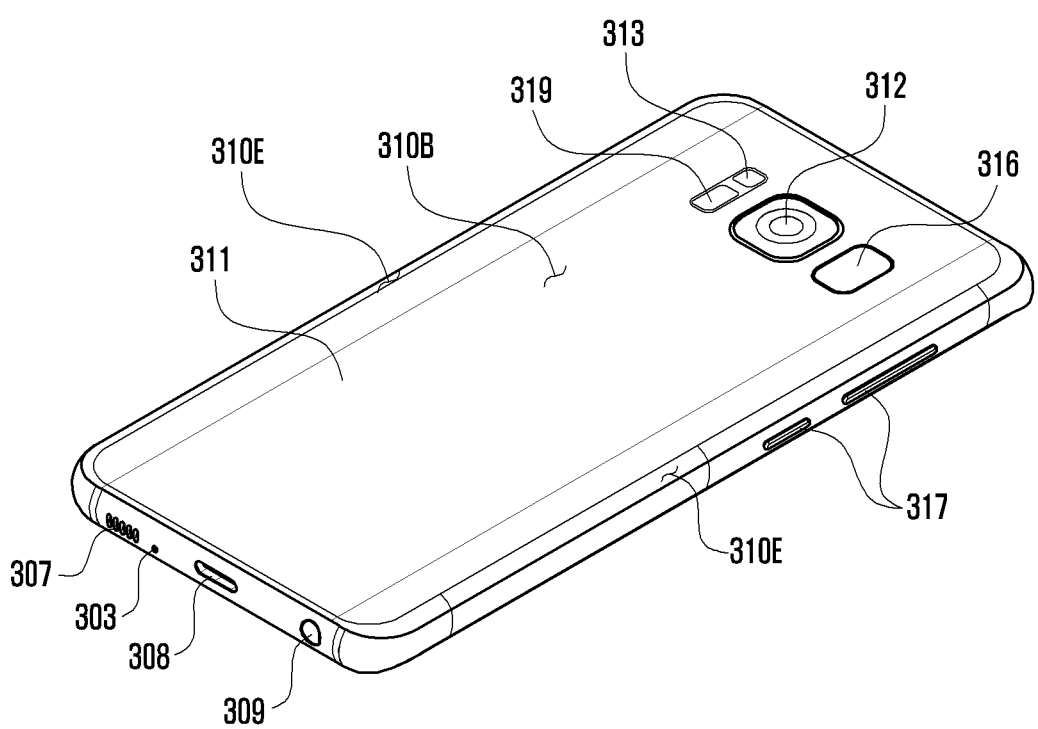
FIG. 3B is a diagram of a rear surface of the electronic device of FIG. 3A, according to an embodiment.

FIG. 3A is a diagram of a front surface of a mobile electronic device, according to an embodiment. FIG. 3B is a diagram of a rear surface of the electronic device of FIG. 3A, according to an embodiment.

With reference to FIGS. 3A and 3B, an electronic device 300 (e.g., the electronic device 101 of FIG. 1) may include a housing 310 including a first surface (or a front surface) 310A, a second surface (or a rear surface) 310B, and a side surface 310C enclosing a space between the first surface 310A and the second surface 310B. The housing 310 may also refer to a structure that forms part of the first surface 310A, the second surface 310B, and the side surface 310C of FIG. 3A. The first surface 310A may be formed by a front plate 302 (e.g., glass plate or polymer plate including various coating layers), at least a part of which is substantially transparent. The second surface 310B may be formed by a substantially opaque rear plate 311. The rear plate 311 may be made of coated or colored glass, ceramic, polymer, metal (e.g., aluminum, stainless steel (STS), or magnesium), or combinations of at least two of the materials. The side surface 310C may be formed by a side bezel structure (or side member) 318 coupled to the front plate 302 and the rear plate 311 and including a metal and/or polymer. The rear plate 311 and the side bezel structure 318 may be integrally formed and include the same material (e.g., a metal material such as aluminum).

The front plate 302 may include two first regions 310D bent from the first surface 310A toward the rear plate 311 to be seamlessly extended at both ends of a long edge of the front plate 302. The rear plate 311 may include two second regions 310E bent from the second surface 310B toward the front plate 302 to be seamlessly extended at both ends of a long edge. The front plate 302 (or the rear plate 311) may include only one of the first regions 310D (or the second regions 310E). The front plate 302 (or the rear plate 311) may not include part of the first regions 310D or the second regions 310E. When viewed from a side surface of the electronic device 300, the side bezel structure 318 may have a first thickness (or width) at the side surface side that does not include first regions 310D or the second regions 310E and have a second thickness smaller than the first thickness at the side surface side including the first regions 310D or the second regions 310E.

The electronic device 300 may include at least one of a display 301, audio modules 303, 307, and 314, sensor modules 304, 316, and 319, camera modules 305, 312, and 313, a key input device 317, a light emitting element 306, and connector holes 308 and 309. The electronic device 300 may omit at least one (e.g., the key input device 317 or the light emitting element 306) component or may include other components.

The display 301 may be exposed through a substantial part of the front plate 302. At least part of the display 301 may be exposed through the front plate 302 forming the first regions 310D of the first surface 310A and the side surface 310C. A corner of the display 301 may be formed substantially equal to an adjacent outer shape of the front plate 302. In order to extend an exposed area of the display 301, a distance between an outer periphery of the display 301 and an outer periphery of the front plate 302 may be substantially equally formed.

In part of a screen display region of the display 301, a recess or an opening may be formed, and the screen display region may include at least one of the audio module 314, the sensor module 304, the camera module 305, and the light emitting element 306 aligned with the recess or the opening. In a rear surface of the screen display area of the display 301, at least one of the audio module 314, the sensor module 304, the camera module 305, the fingerprint sensor 316, and the light emitting element 306 may be included. The display 301 may be coupled to, or may be disposed adjacent to, a touch sensing circuit, a pressure sensor for measuring intensity (pressure) of a touch, and/or a digitizer for detecting a magnetic field type stylus pen. At least part of the sensor modules 304 and 319 and/or at least part of the key input device 317 may be disposed in the first regions 310D and/or the second regions 310E.

The audio modules 303, 307, and 314 may include a microphone hole 303 and speaker holes 307 and 314. The microphone hole 303 may dispose a microphone for obtaining an external voice therein, and a plurality of microphones may be disposed to detect a direction of a sound. The speaker holes 307 and 314 may include an external speaker hole 307 and a call receiver hole 314. The speaker holes 307 and 314 and the microphone hole 303 may be implemented into a single hole or a speaker (e.g., piezo speaker) may be included without the speaker holes 307 and 314.

The sensor modules 304, 316, and 319 may generate an electrical signal or a data value corresponding to an internal operation state or an external environment state of the electronic device 300. The sensor modules 304, 316, and 319 may include a first sensor module 304 (e.g., proximity sensor) and/or a second sensor module (e.g., fingerprint sensor) disposed at the first surface 310A of the housing 310, and/or a third sensor module 319 (e.g., heart rate monitor (HRM) sensor) and/or a fourth sensor module 316 (e.g., fingerprint sensor) disposed at the second surface 310B of the housing 310. The fingerprint sensor may be disposed at the second surface 310B as well as the first surface 310A (e.g., the display 301) of the housing 310. The electronic device 300 may further include a sensor module, including at least one of a gesture sensor, gyro sensor, atmospheric pressure sensor, magnetic sensor, acceleration sensor, grip sensor, color sensor, infrared (IR) sensor, biometric sensor, temperature sensor, humidity sensor, or illuminance sensor 304.

The camera modules 305, 312, and 313 may include a first camera device 305 disposed at the first surface 310A of the electronic device 300, a second camera device 312 disposed at the second surface 310B, and/or a flash 313. The camera devices 305 and 312 may include one or a plurality of lenses, an image sensor, and/or an image signal processor. The flash 313 may include a light emitting diode or a xenon lamp. At least two lenses (such as an infrared camera, wide angle lens, and telephoto lens) and image sensors may be disposed at one surface of the electronic device 300.

The key input device 317 may be disposed at the side surface 310C of the housing 310. The electronic device 300 may not include some or all of the above-described types of key input device 317, and any key input device 317 that is not included may be implemented in other forms such as a soft key on the display 301. The key input device may include a sensor module 316 disposed at the second surface 310B of the housing 310.

The light emitting element 306 may be disposed at the first surface 310A of the housing 310. The light emitting element 306 may provide status information of the electronic device 300 in an optical form. The light emitting element 306 may provide a light source interworked with an operation of the camera module 305. The light emitting element 306 may include a light emitting diode (LED), an IR LED, and a xenon lamp.

The connector holes 308 and 309 may include a first connector hole 308 that may receive a connector (e.g., a USB connector) for transmitting and receiving power and/or data to and from an external electronic device and/or a second connector hole (e.g., the earphone jack) 309 that may receive a connector for transmitting and receiving an audio signal to and from an external electronic device.

Figure 4:
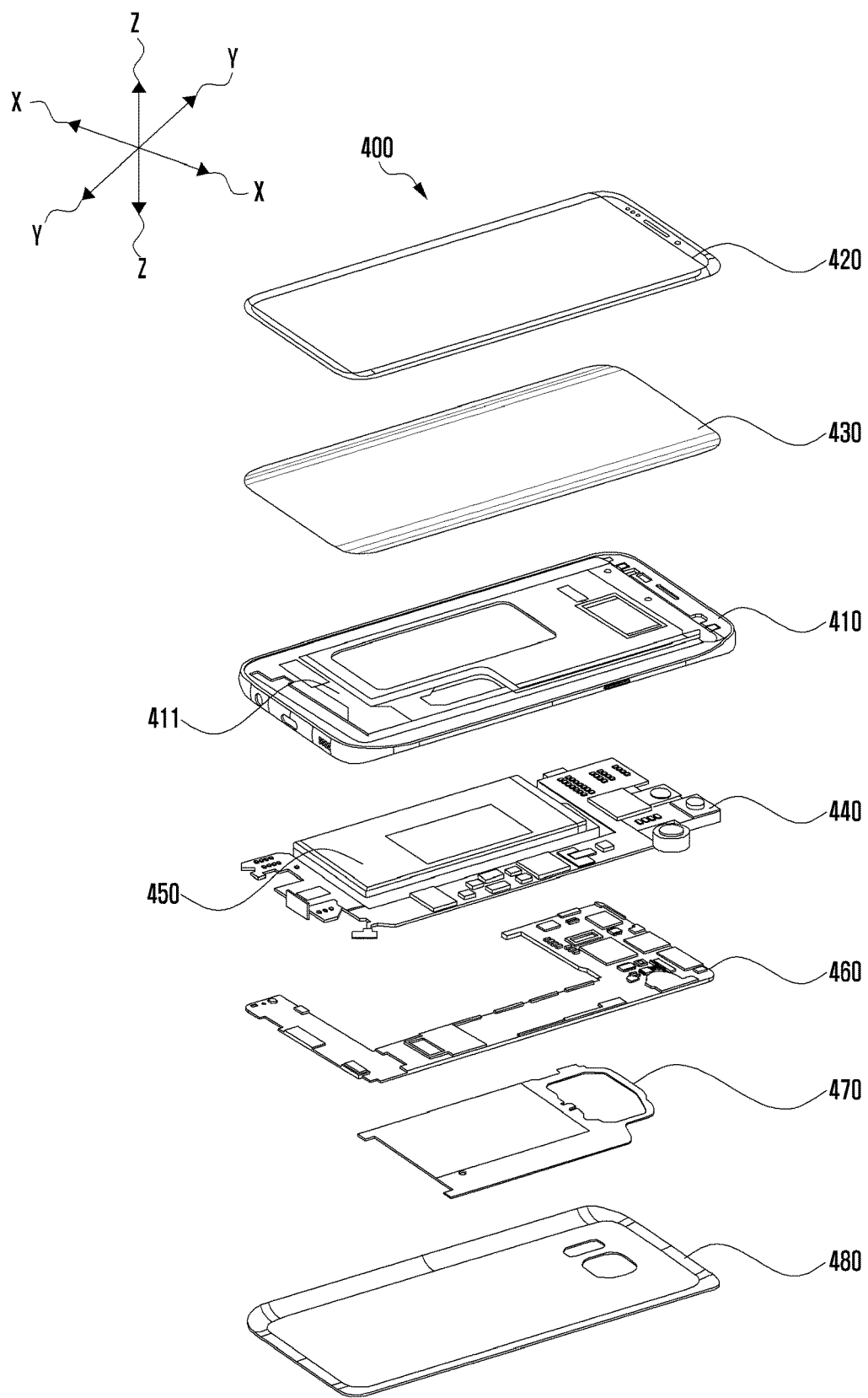
FIG. 4 is a diagram of the electronic device of FIG. 3A, according to an embodiment.

FIG. 4 is a diagram of a mobile electronic device, according to an embodiment.

With reference to FIG. 4, an electronic device 400 (e.g., the electronic device 101 of FIG. 1) may include a side bezel structure 410, first support member 411 (e.g., bracket), front plate 420, display 430, printed circuit board (PCB) 440, battery 450, second support member 460 (e.g., rear case), antenna 470, and rear plate 480. The electronic device 400 may omit at least one (e.g., the first support member 411 or the second support member 460) component or may include other components. At least one of the components of the electronic device 400 may be the same as and similar to at least one of the components of the electronic device 300 of FIG. 3A or 3B; thus, a detailed description thereof is omitted.

The first support member 411 may be disposed inside the electronic device 400 to be connected to the side bezel structure 410 or may be formed integrally with the side bezel structure 410. The first support member 411 may be made of a metal material and/or a non-metallic (e.g., polymer) material. The display 430 may be coupled to one surface of the first support member 411, and the PCB 440 may be coupled to the other surface thereof. In the PCB 440, a processor, a memory, and/or an interface may be mounted. The processor may include at least one of a CPU, AP, GPU, ISP, sensor hub processor, or CP.

The memory may include a volatile memory or a non-volatile memory.

The interface may include a high definition multimedia interface (HDMI), USB interface, secure digital (SD) card interface, and/or audio interface. The interface may electrically or mechanically connect the electronic device 400 to an external electronic device and include a USB connector, SD card/MMC connector, or audio connector.

The battery 450 is a device for supplying power to at least one component of the electronic device 400 and may include a non-rechargeable primary battery, rechargeable secondary battery, or fuel cell. At least part of the battery 450 may be disposed on substantially the same plane as that of the PCB 440. The battery 450 may be disposed integrally inside the electronic device 400 and may be disposed detachably from the electronic device 400.

The antenna 470 may be disposed between the rear plate 480 and the battery 450. The antenna 470 may include a NFC antenna, wireless charging antenna, and/or MST. The antenna 470 may perform short range communication with an external device or may transmit and receive power necessary for charging by a wireless means. An antenna structure may be formed by some of the side bezel structure 410 and/or the first support member 411 or a combination thereof.

The electronic device may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 5:
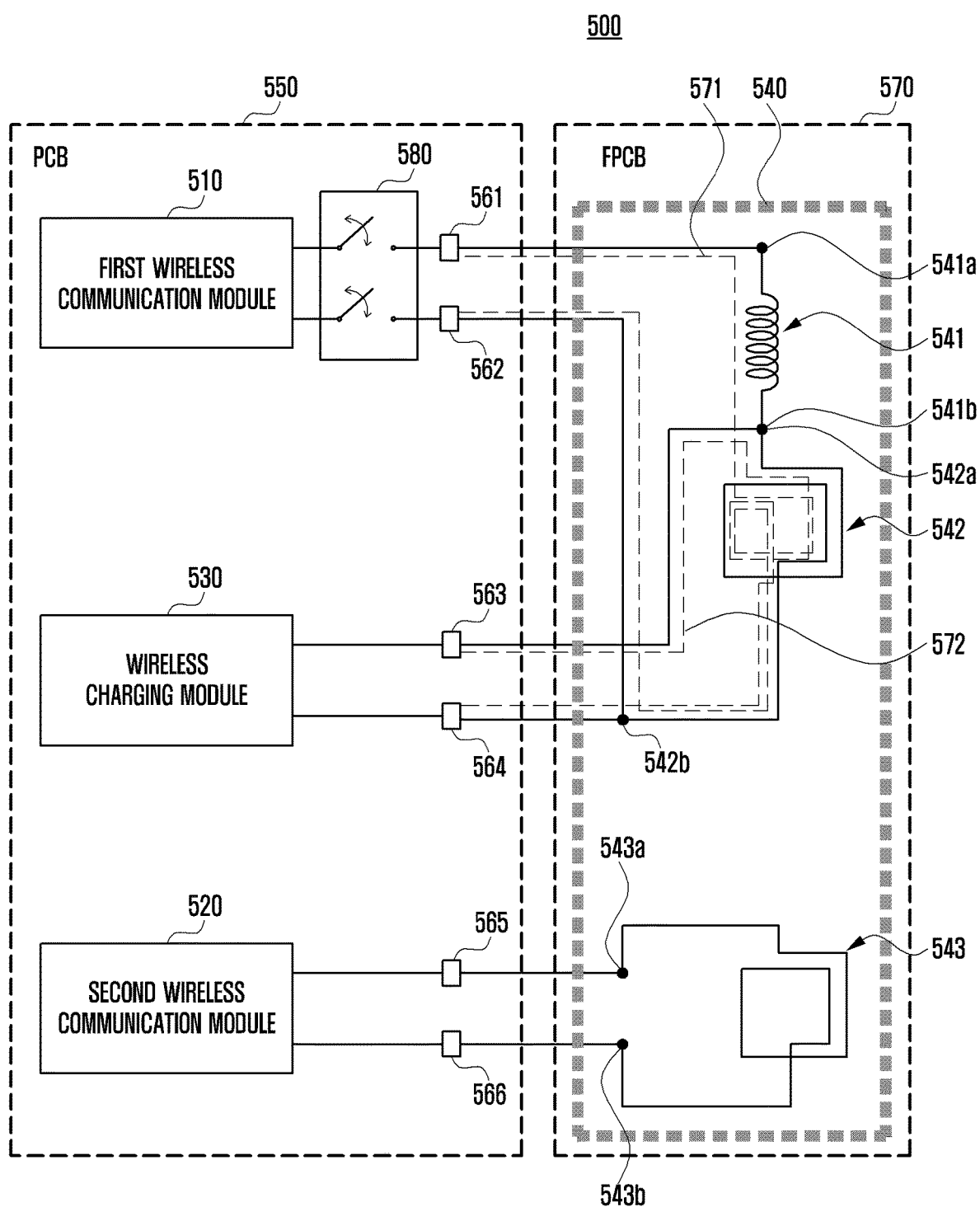
FIG. 5 is a diagram of an electronic device including a coil antenna for both wireless communication and wireless charging, according to an embodiment.

FIG. 5 is a diagram of an electronic device including a coil antenna for both wireless communication and wireless charging, according to an embodiment.

With reference to FIG. 5, an electronic device 500 (e.g., the electronic device 101) may include a first wireless communication module 510 (e.g., the MST communication module 210 of FIG. 2), a second wireless communication module 520 (e.g., the NFC communication module 230 of FIG. 2), a wireless charging module 530 (e.g., the wireless charging module 250 of FIG. 2), and an antenna 540 (e.g., the antenna module 197 of FIG. 1).

The first wireless communication module 510, the second wireless communication module 520, and the wireless charging module 530 may be mounted on a PCB 550 (e.g., the PCB 440 of FIG. 4).

In the PCB 550, a plurality of pads for electrically connecting the first wireless communication module 510, the second wireless communication module 520, and the wireless charging module 530 to the antenna 540 may be formed. A first electrode and a second electrode of the first wireless communication module 510 may be electrically connected to the antenna 540 through a first pad 561 and a second pad 562, respectively. The first electrode and the second electrode of the wireless charging module 530 may be electrically connected to the antenna 540 through a third pad 563 and a fourth pad 564, respectively. The first electrode and the second electrode of the second wireless communication module 520 may be electrically connected to the antenna 540 through a fifth pad 565 and a sixth pad 566, respectively.

The antenna 540 (e.g., the antenna 470 of FIG. 4) may include a plurality of coil antennas (in other words, conductive coil or loop antenna). The antenna 540 may include a first coil antenna 541 for first wireless communication (e.g., MST), a second coil antenna 542 for both first wireless communication and wireless charging, and a third coil antenna 543 for second wireless communication (e.g., NFC).

When the first coil antenna 541 and the second coil antenna 542 are configured with a series circuit and when the second coil antenna 542 is configured to be shared by the first wireless communication module 510 and the wireless charging module 530, the first coil antenna 541 and the second coil antenna 542 may be used as an antenna of the first wireless communication module 510, and the second coil antenna 542 may be used as an antenna of the wireless charging module 530. One end 541a of the first coil antenna 541 may be electrically connected to a first electrode of the first wireless communication module 510 through the first pad 561. One end 542a of the second coil antenna 542 may be electrically connected to the other end 541b of the first coil antenna 541, and the other end 542b thereof may be electrically connected to the second electrode of the wireless charging module 530 through the fourth pad 564. One end 542a of the second coil antenna 542 may be electrically connected to a first electrode of the wireless charging module 530 through the third pad 563. The other end 542b of the second coil antenna 542 may be electrically connected to a second electrode of the first wireless communication module 510 through the second pad 562.

When a current is fed from the first wireless communication module 510 to the first pad 561 or the second pad 562, a first current path 571 may be formed in the antenna 540. The first coil antenna 541 and the second coil antenna 542 may generate a first magnetic signal by the first current path 571 to emit the first magnetic signal to the outside. An electrical signal of a frequency corresponding to electrical characteristics (e.g., capacitance (C), inductance (L), resistance (R)) of the first coil antenna 541 and the second coil antenna 542 may be selected (i.e., resonated). The first coil antenna 541 and the second coil antenna 542 may generate a first magnetic signal by the selected electrical signal to emit the first magnetic signal to the outside. When a current is fed from the wireless charging module 530 to the third pad 563 or the fourth pad 564, a second current path 572 may be formed in the antenna 540. The second coil antenna 542 may generate a second magnetic signal by the second current path 572 to emit the second magnetic signal to the outside. Further, the second coil antenna 542 may receive a magnetic signal corresponding to the second magnetic signal from the outside and generate an electrical signal from the received magnetic signal to transfer the electrical signal to the wireless charging module 530 through the third pad 563 and the fourth pad 564.

One end 543a of the third coil antenna 543 may be electrically connected to a first electrode of the second wireless communication module 520 through the fifth pad 565, and the other end 543b thereof may be electrically connected to a second electrode of the second wireless communication module 520 through the sixth pad 566. When a current is fed from the second wireless communication module 520 to the fifth pad 565 or the sixth pad 566, a third current path may be formed in the antenna 540. The third coil antenna 543 may generate a third magnetic signal by the third current path to emit the third magnetic signal to the outside. The third coil antenna 543 may receive a magnetic signal corresponding to the third magnetic signal from the outside and generate an electrical signal from the received magnetic signal to transfer the electrical signal to the second wireless communication module 520 through the fifth pad 565 and the sixth pad 566.

The antenna 540 (e.g., the antenna 470 of FIG. 4) may be formed in a FPCB 570 of a multilayer structure.

A first part of the first coil antenna 541 may be formed in any one layer of the FPCB 570, the remaining second part may be formed in another layer, and the first part and the second part may be electrically connected through a via. The first coil antenna 541 and the second coil antenna 542 may be formed in different layers. The other end 541b of the first coil antenna 541 and one end 542a of the second coil antenna 542 may be electrically connected through a via.

A first part of the second coil antenna 542 and the first part of the third coil antenna 543 may be formed in any one layer of the FPCB 570, and the remaining second part of the second coil antenna 542 and the remaining second part of the third coil antenna 543 may be formed in another one layer of the FPCB 570. The first part and the second part of the second coil antenna 542 formed in different layers may be electrically connected through a via. Further, the first part and the second part of the third coil antenna 543 formed in different layers may be electrically connected through a via.

The antenna 540 (e.g., the antenna 470 of FIG. 4) may include different types of coil antennas. The first coil antenna 541 may be a conductive coil having a Y-axis (Y-axis of FIG. 3) substantially perpendicular to a Z-axis (e.g., a Z-axis of FIG. 3). The first coil antenna 541 may be a so-called solenoid type coil wound several times in one direction about a vertical axis. Therefore, a magnetic signal may be emitted in a direction perpendicular to a Z-axis in the first coil antenna 541. The second coil antenna 542 and the third coil antenna 543 may be conductive coils having a substantially Z-axis (e.g., Z-axis of FIG. 3). The second coil antenna 542 and the third coil antenna 543 may be a so-called flat type (in order words, spiral type) coil spirally formed on an XY plane about a Z-axis. Therefore, in the second coil antenna 542 and the third coil antenna 543, a magnetic signal may be emitted in a Z-axis direction.

The electronic device 500 may further include a switch 580 for protecting the first wireless communication module 510 from external power. The switch 580 may be mounted in the PCB 550 (e.g., the PCB 440 of FIG. 4). The switch 580 may connect the first wireless communication module 510 to the first pad 561 and the second pad 562 or may disconnect such a connection. A current may be fed from the first wireless communication module 510 to the first pad 561 or the second pad 562 through the switch 580 of a close state, and a first current path 571 may be formed in the antenna 540. When a current is fed from the wireless charging module 530 to the third pad 563 or the fourth pad 564 (in this case, the switch 580 may be in an open state under the control of the processor (e.g., the processor 120 of FIG. 1)), a second current path 572 may be formed in the antenna 540.

Figure 6:
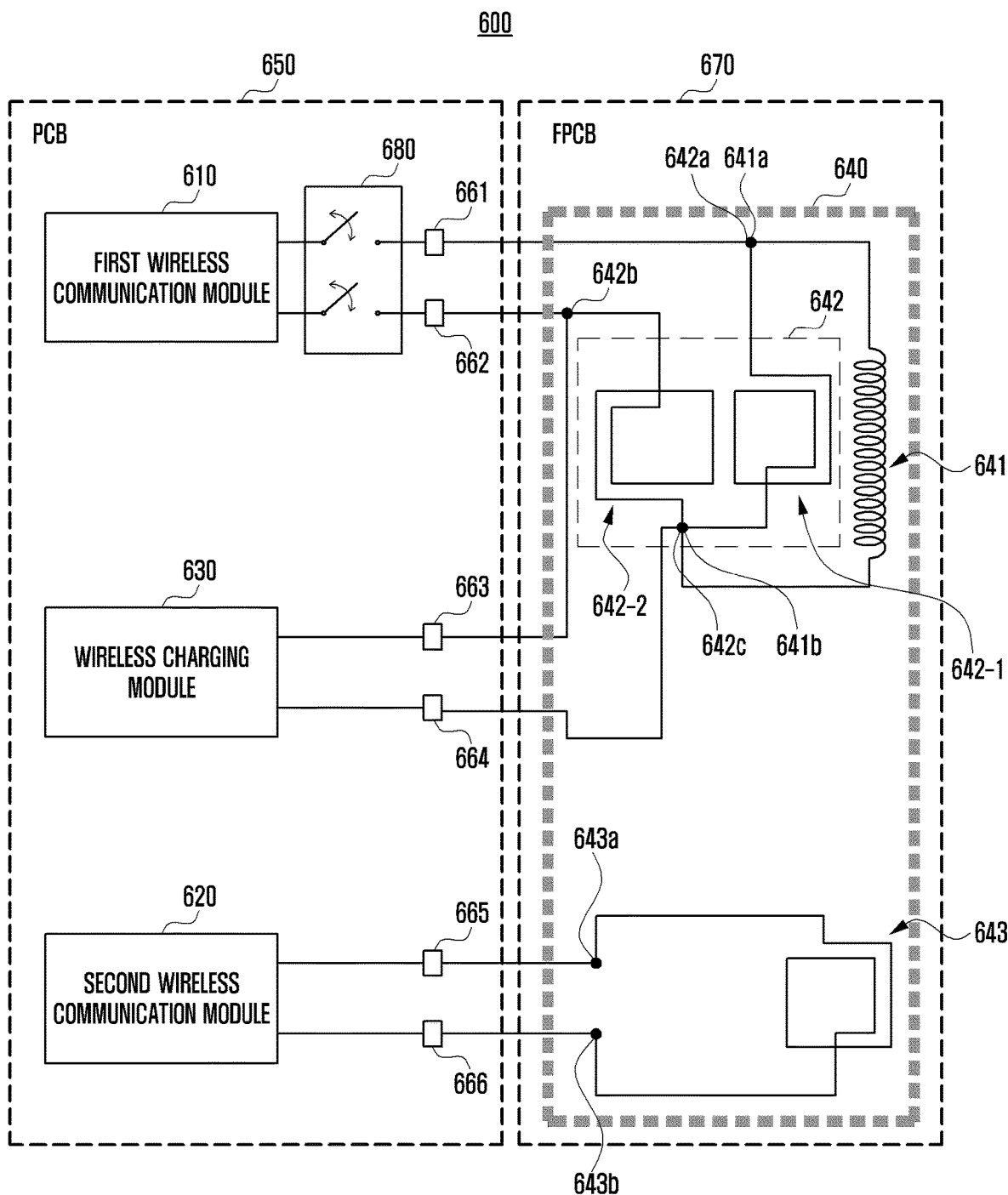
FIG. 6 is a diagram of an electronic device including a coil antenna for both wireless communication and wireless charging and having an antenna circuit configuration, according to an embodiment.

FIG. 6 is a diagram of an electronic device including a coil antenna for both wireless communication and wireless charging and having an antenna circuit configuration different from that of FIG. 5, according to an embodiment.

With reference to FIG. 6, an electronic device 600 (e.g., the electronic device 101) may include a first wireless communication module 610 (e.g., the MST communication module 210 of FIG. 2), a second wireless communication module 620 (e.g., the NFC communication module 230 of FIG. 2), a wireless charging module 630 (e.g., the wireless charging module 250 of FIG. 2), a switch 680, and an antenna 640 (e.g., the antenna module 197 of FIG. 1). For convenience of description, components identical to or corresponding to those of FIG. 5 may be omitted or may be briefly described.

The first wireless communication module 610, the second wireless communication module 620, the wireless charging module 630, and the switch 680 may be mounted in a PCB 650 (e.g., the PCB 440 of FIG. 4). The switch 680 may connect the first wireless communication module 610 to a first pad 661 and a second pad 662 or may disconnect such a connection.

The antenna 640 (e.g., the antenna 470 of FIG. 4) may include a first coil antenna 641 for first wireless communication (e.g., MST), a second coil antenna 642 for both first wireless communication and wireless charging, and a third coil antenna 643 for second wireless communication (e.g., NFC).

When the first coil antenna 641 is configured in a parallel circuit with part (e.g., a (2-1)th coil antenna 642-1) of the second coil antenna 642 and is configured in a series circuit with another part (e.g., a (2-2)th coil antenna 642-2) of the second coil antenna 642, and when the first wireless communication module 610 and the wireless charging module 630 are configured to share the other part of the second coil antenna 642, the first coil antenna 641 and the second coil antenna 642 may be used as an antenna of the first wireless communication module 610, and the (2-2)th coil antenna 642-2 may be used as an antenna of the wireless charging module 630. One end 641*a* of the first coil antenna 641 and one end 642*a* of the second coil antenna 642 may be connected to each other and may be electrically connected to a first electrode of the first wireless communication module 610 through the first pad 661. The other end 641*b* of the first coil antenna 641 may be electrically connected to a point (hereinafter, an intermediate point 642*c*) that separates an occupying part (the (2-1)th coil antenna 642-1) of the first wireless communication module 610 and a sharing part ((2-2)th coil antenna 642-2) of the first wireless communication module 610 and the wireless charging module 630 in the second coil antenna 642. The other end 642*b* of the second coil antenna 642 may be electrically connected to a second electrode of the first wireless communication module 610 through the second pad 662 and may be electrically connected to a first electrode of the wireless charging module 630 through a third pad 663. The intermediate point 642*c* of the second coil antenna 642 and the other end 641*b* of the first coil antenna 641 may be electrically connected to a second electrode of the wireless charging module 630 through a fourth pad 664.

When a current is fed from the first wireless communication module 610 to the first pad 661 or the second pad 662 through the switch 680 of a closed state, a first current path may be formed in the antenna 640. The first coil antenna 641 and the second coil antenna 642 may generate a first magnetic signal by the first current path to emit the first magnetic signal to the outside. When a current is fed from the wireless charging module 630 to the third pad 663 or the fourth pad 664 (in this case, the switch 680 may be in an open state), a second current path may be formed in the antenna 640. The (2-2)th coil antenna 642-2 may generate a second magnetic signal by the second current path to emit the second magnetic signal to the outside. The (2-2)th coil antenna 642-2 may receive a magnetic signal corresponding to the second magnetic signal from the outside (in this case, the switch 680 may be in an open state), and generate an electrical signal from the received magnetic signal to transfer the electrical signal to the wireless charging module 630 through the third pad 663 and the fourth pad 664.

One end 643*a* of the third coil antenna 643 may be electrically connected to a first electrode of the second wireless communication module 620 through a fifth pad 665, and the other end 643*b* thereof may be electrically connected to a second electrode of the second wireless communication module 620 through a sixth pad 666. When a current is fed from the second wireless communication module 620 to the fifth pad 665 or the sixth pad 666, a third current path may be formed in the antenna 640. The third coil antenna 643 may generate a third magnetic signal by the third current path to emit the third magnetic signal to the outside. The third coil antenna 643 may receive a magnetic signal corresponding to the third magnetic signal from the outside and generate an electrical signal by the received magnetic signal to transfer the electrical signal to the second wireless communication module 620 through the fifth pad 665 and the sixth pad 666.

The antenna 640 (e.g., the antenna 470 of FIG. 4) may be formed in an FPCB 670 of a multilayer structure.

A first part of the first coil antenna 641 may be formed in any one layer of the FPCB 670, the remaining second part may be formed in different layers of the FPCB 670, and the first part and the second part may be electrically connected through a via. The first coil antenna 641 and the second coil antenna 642 may be formed in different layers. One end 641*a* of the first coil antenna 641 and one end 642*a* of the second coil antenna 642 may be electrically connected through a via. The other end 641*b* of the first coil antenna 641 and the intermediate point 642*c* of the second coil antenna 642 may be electrically connected through the via.

The (2-1)th coil antenna 642-1 and the (2-2)th coil antenna 642-2 may be formed in different layers and may be electrically connected through the via.

A first part of the third coil antenna 643 may be formed in any one layer of the FPCB 670, the remaining second part may be formed in a different layer, and the first part and the second part may be electrically connected through the via. The first part may be formed in the same layer as that of the (2-1)th coil antenna 642-1, and the second part may be formed in the same layer as that of the (2-2)th coil antenna 642-2.

The antenna 640 (e.g., the antenna 470 of FIG. 4) may include different types of coil antennas. The first coil antenna 641 may be a solenoid type coil, and the other coil antennas 642 and 643 may be planar type coils.

Figure 7:
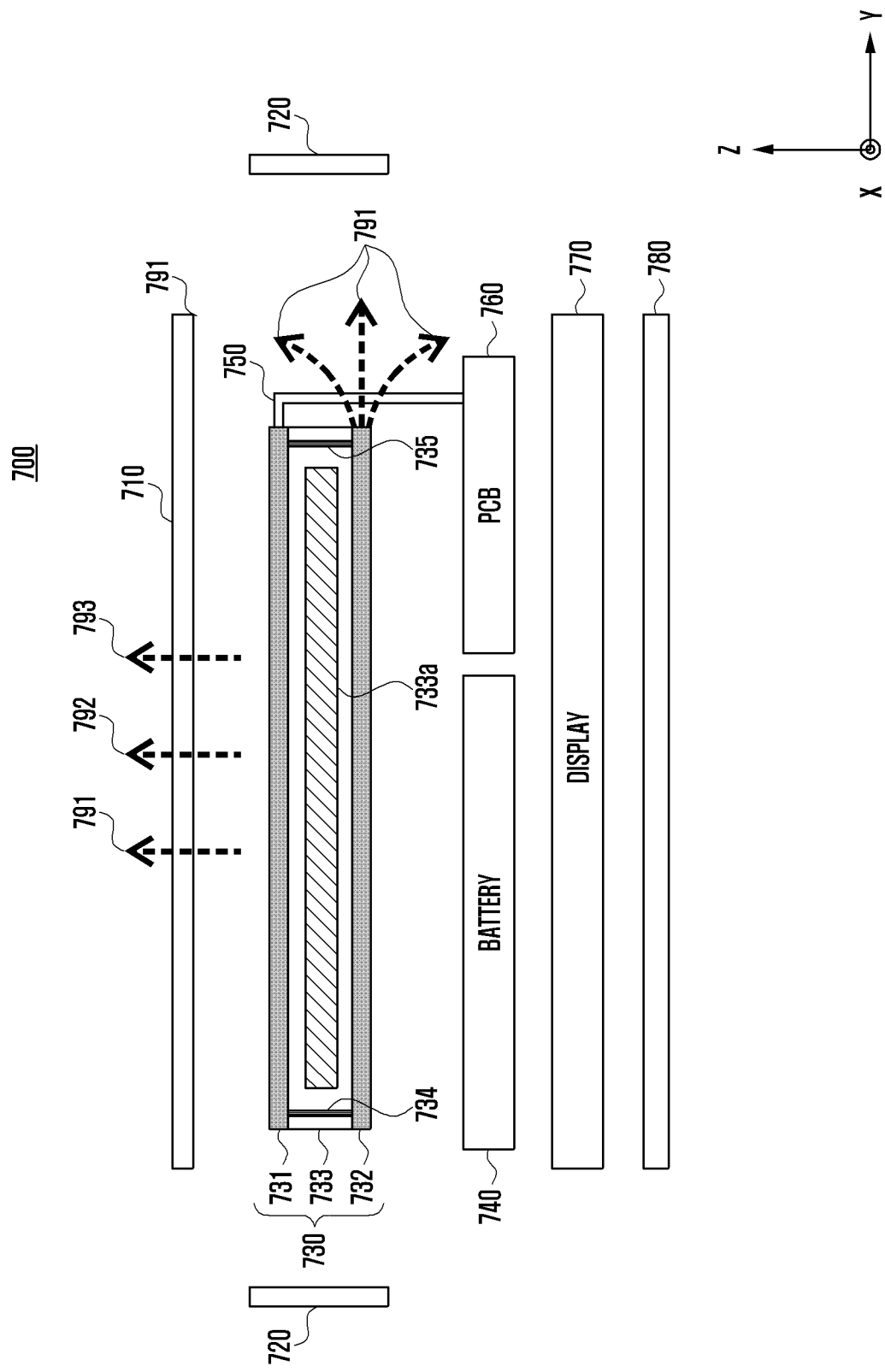
FIG. 7 is a diagram of an electronic device having a flexible printed circuit board (FPCB) in which a plurality of coil antennas is formed, according to an embodiment.

FIG. 7 is a diagram of an electronic device having an FPCB in which a plurality of coil antennas is formed, according to an embodiment.

With reference to FIG. 7, an electronic device 700 (e.g., the electronic device 101 of FIG. 1) may include a rear plate 710 (e.g., the rear plate 480 of FIG. 4), a side bezel structure 720 (e.g., the side bezel structure 410 of FIG. 4), a first FPCB 730 (e.g., the antenna 470 of FIG. 4), a battery 740 (e.g., the battery 450 of FIG. 4), a second FPCB 750, a PCB 760 (e.g., the PCB 440 of FIG. 4), a display 770 (e.g., the display 430 of FIG. 4), and a front plate 780 (e.g., the front plate 420 of FIG. 4). At least one of the components of the electronic device 700 may be the same as or similar to at least one of the components of the electronic device 400 of FIG. 4; thus, a detailed description thereof may be omitted.

The first FPCB 730 may include an upper layer (or first layer) 731, a lower layer (or second layer) 732, and an intermediate layer 733 positioned therebetween. As illustrated in FIG. 7, the upper layer 731 may be disposed close to the rear plate 710, and the lower layer 732 may be disposed close to the battery 740.

The lower layer 732 may include a solenoid type coil antenna. The first loop antenna (e.g., the first coil antenna 541 of FIG. 5 or the first coil antenna 641 of FIG. 6) formed in the lower layer 732 may generate a first magnetic signal 791 (e.g., MST signal) of a Y-axis direction. The first magnetic signal 791 may be emitted to the outside of the electronic device 700 through a non-conductive part (e.g., the rear plate 710, the side bezel structure 720, or the front plate 780) of the electronic device 700.

The upper layer 731 may include a plurality of coil antennas of a flat type, and a magnetic signal generated in such coil antennas may be emitted to the outside of the electronic device 700 through a non-conductive part of the electronic device 700. A second coil antenna (e.g., the second coil antenna 542 of FIG. 5 or the second coil antenna 642 of FIG. 6) formed in the upper layer 731 may generate a first magnetic signal 791 of a Z-axis direction. The second coil antenna or part thereof (e.g., the (2-2)th coil antenna 642-2 of FIG. 6) may generate a second magnetic signal 792 (e.g., wireless charging signal) of a Z-axis direction. A third coil antenna (e.g., the third coil antenna 543 of FIG. 5 or the third coil antenna 643 of FIG. 6) formed in the upper layer 731 may generate a third magnetic signal 793 (e.g., NFC signal) of a Z-axis direction.

The intermediate layer 733 may include a shielding member 733a (e.g., shield sheet) for performing a function of protecting electronic components (e.g., the battery 740, the display 770, or the PCB 760) positioned below the first FPCB 730 from a magnetic signal of a Z-axis direction generated in the upper layer 731 or a passage function of the generated magnetic field. As the shielding member 733a nanocrystal, metal polymer, amorphous material, graphite, or ferrite may be applied.

The intermediate layer 733 may include at least one first via 734 that electrically connects a coil antenna formed in the upper layer 731 and a coil antenna formed in the lower layer 732.

The first coil antenna 541 may be formed in the lower layer 732, and the second coil antenna 542 may be formed in the upper layer 731. Therefore, the first via 734 may include a via for connecting the other end 541b of the first coil antenna 541 to one end 542a of the second coil antenna 542.

The first coil antenna 641 may be formed in the lower layer 732, and the second coil antenna 642 may be formed in the upper layer 731. Therefore, the first via 734 may include a via for connecting the other end 641b of the first coil antenna 641 to the intermediate point 642c of the second coil antenna 642.

The intermediate layer 733 may further include at least one second via 735 for electrically connecting the coil antenna formed in the lower layer 732 to the upper layer 731. The electronic device 700 may further include a second FPCB 750 as a structure for electrically connecting the upper layer 731 to the PCB 760. The second FPCB 750 may electrically connect a coil antenna formed in the upper layer 731 to the PCB 760. Further, as the second FPCB 750 is electrically connected to the second via 735, the second FPCB 750 may electrically connect the coil antenna formed in the lower layer 732 to the PCB 760.

The first coil antenna may be formed in the lower layer 732, and the second coil antenna 542 and the third coil antenna 543 may be formed in the upper layer 731. Therefore, the second via 735 may include a (2-1)th via electrically connected to one end 541a of the first coil antenna 541 and a (2-2)th via electrically connected to the other end 541b of the first coil antenna 541. The second FPCB 750 may include a first wiring line electrically connected to the (2-1)th via to electrically connect one end 541a of the first coil antenna 541 to the first pad 561, a second wiring line electrically connected to the (2-2)th via to electrically connect the other end 541b of the first coil antenna 541 to the third pad 563, a third wiring line for electrically connecting one end 542a of the second coil antenna 542 to the third pad 563, a fourth wiring line for electrically connecting the other end 542b of the second coil antenna 542 to the second pad 562 and the fourth pad 564, a fifth wiring line for electrically connecting one end 543a of the third coil antenna 543 to the fifth pad 565, and a sixth wiring line for electrically connecting the other end 543b of the third coil antenna 543 to the sixth pad 566. Because the (2-2)th via may be replaced with the first via 734, the (2-2)th via may be omitted from the first FPCB 730. That is, the first via 734 may electrically connect the other end 541b of the first coil antenna 541 to one end 542a of the second coil antenna 542 and electrically connect the other end 541b of the first coil antenna 541 to the third wiring line.

The first coil antenna 641 may be formed in the lower layer 732, and the second coil antenna 642 and the third coil antenna 643 may be formed in the upper layer 731. Therefore, the second via 735 may include a (2-3)th via electrically connected to one end 641a of the first coil antenna 641 and a (2-4)th via electrically connected to the other end 641b of the first coil antenna 641. The second FPCB 750 may include a seventh wiring line electrically connected to the (2-3)th via to electrically connect one end 641a of the first coil antenna 641 to the first pad 661 and to electrically connect one end 642a of the second coil antenna 642 to the first pad 661, an eighth wiring line for electrically connecting the other end 642b of the second coil antenna 642 to the second pad 662 and the third pad 663, a ninth wiring line electrically connected to a (2-4)th via to electrically connect the other end 641b of the first coil antenna 641 to the fourth pad 664, a tenth wiring line for electrically connecting the intermediate point 642c of the second coil antenna 642 to the fourth pad 664, an eleventh wiring line for electrically connecting one end 643a of the third coil antenna 643a to the fifth pad 665, and a twelfth wiring line for electrically connecting the other end 643b of the third coil antenna 643 to the sixth pad 666. Because the (2-4)th via may be replaced with the first via 734, the (2-4)th via may be omitted in the first FPCB 730. That is, the first via 734 may electrically connect the other end 641b of the first coil antenna 641 to the intermediate point 642c of the second coil antenna 642 and electrically connect the other end 641b of the first coil antenna 641 to the eighth wiring line.

The electronic device 700 may include a plurality of pins (e.g., C-clips) that replace the second FPCB 750.

When describing an embodiment with reference to FIG. 5, a first terminal electrically connected to one end 541a of the first coil antenna 541 through the (2-1)th via may be protruded from the upper layer 731, and the first terminal contacts a first pin to be electrically connected to the first pad 561. A second terminal electrically connected to the other end 541b of the first coil antenna 541 through the (2-2)th via may be protruded from the upper layer 731, and the second terminal may be electrically connected to the third pad 563 through a second pin. A third terminal electrically connected to one end 542a of the second coil antenna 542 may be protruded from the upper layer 731, and the third terminal may be electrically connected to the third pad 563 through a third pin. A fourth terminal electrically connected to the other end 542b of the second coil antenna 542 may be protruded from the upper layer 731, and the fourth terminal may be electrically connected to the second pad 562 and the fourth pad 564 through a fourth pin. A fifth terminal electrically connected to one end 543a of the third coil antenna 543 may be protruded from the upper layer 731, and the fifth terminal may be electrically connected to the fifth pad 565 through a fifth pin. A sixth terminal electrically connected to the other end 543b of the third coil antenna 543 may be protruded from the upper layer 731, and the sixth terminal may be electrically connected to the sixth pad 566 through a sixth pin.

When describing an embodiment with reference to FIG. 6, a first terminal electrically connected to one end 641a of the first coil antenna 641 through the (2-3)th via may be protruded from the upper layer 731, and the first terminal may be electrically connected to the first pad 661 through a first pin. A second terminal electrically connected to one end 642a of the second coil antenna 642 may be protruded from the upper layer 731, and the second terminal may be electrically connected to the first pad 661 through a second pin. A third terminal electrically connected to the other end 642b of the second coil antenna 642 may be protruded from the upper layer 731, and the third terminal may be electrically connected to the second pad 662 and the third pad 663 through a third pin. A fourth terminal electrically connected to the other end 641*b* of the first coil antenna 641 through a (2-4)th via and electrically connected to the intermediate point 642*c* of the second coil antenna 642 may be protruded from the upper layer 731, and the fourth terminal may be electrically connected to the fourth pad 664 through a fourth pin. A fifth terminal electrically connected to one end 643*a* of the third coil antenna 643 may be protruded from the upper layer 731, and the fifth terminal may be electrically connected to the fifth pad 665 through a fifth pin. A sixth terminal electrically connected to the other end 643*b* of the third coil antenna 643 may be protruded from the upper layer 731, and the sixth terminal may be electrically connected to the sixth pad 666 through a sixth pin.

Figure 8A:
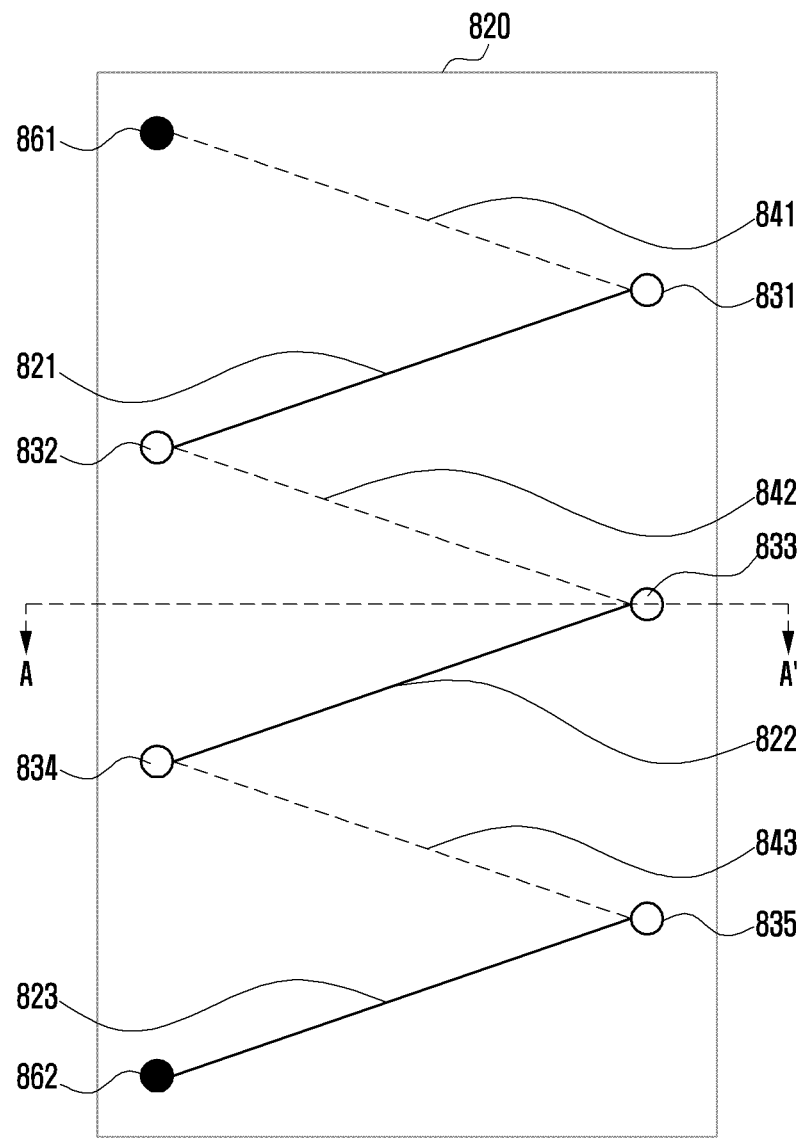
FIG. 8A is a diagram of a front surface of a lower layer in the FPCB of FIG. 7, according to an embodiment.
Figure 8A:
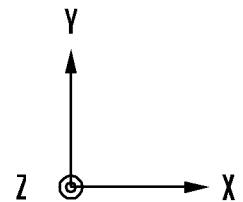
Figure 8B:
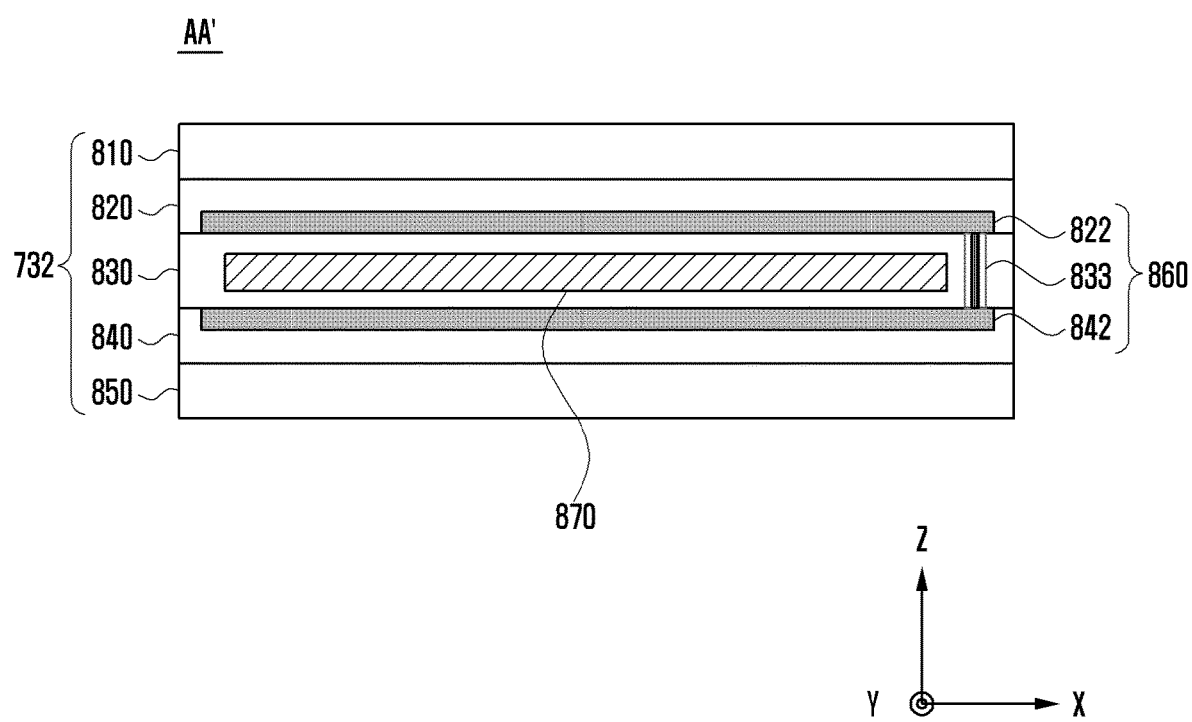
FIG. 8B is a diagram of the lower layer taken along line AA' of FIG. 8A, according to an embodiment.

FIG. 8A is a diagram of a front surface of the lower layer 732 in the FPCB 730 of FIG. 7, according to an embodiment. FIG. 8B is a diagram of the lower layer 732 taken along line AA' of FIG. 8A, according to an embodiment.

With reference to FIGS. 8A and 8B, the lower layer 732 may include a first protective layer (or (3-1)th layer) 810, a first conductive pattern layer (or (3-2)th layer) 820, an intermediate layer (or (3-3)th layer) 830, a second conductive pattern layer (or (3-4)th layer) 840, and a second protective layer (or (3-5)th layer) 850.

The first protective layer 810 and the second protective layer 850 are sheets for protecting a conductive pattern, and a film of a non-metallic or non-conductive material may be applied to the first protective layer 810 and the second protective layer 850.

The first conductive pattern layer 820 and the second conductive pattern layer 840 have a multilayer structure in which a solenoid type first coil antenna (e.g., the first coil antenna 541 of FIG. 5 or the first coil antenna 641 of FIG. 6) is formed and may include a so-called flexible copper clad laminate (FCCL) in which copper is coated on a polyimide (PI) film. The first conductive pattern layer 820 may include a plurality of wiring lines 821, 822, and 823 forming part of a first coil antenna 860. The second conductive pattern layer 840 may include a plurality of wiring lines 841, 842, and 843 forming the other part of the first coil antenna 860. For convenience of description, only three strand wiring lines are illustrated, but in order to support generation of the corresponding magnetic signal (e.g., MST signal), it is well known to a person of ordinary skill in the art that wiring lines having strands more than three strands may be formed in the conductive pattern layer.

The intermediate layer 830 may include a plurality of vias 831 to 835 for connecting part of a first coil antenna 860 formed in the first conductive pattern layer 820 and another part of the first coil antenna 860 formed in the second conductive pattern layer 840. That is, wiring lines 821, 822, and 823 disposed in the first conductive pattern layer 820 and wiring lines 841, 842, and 843 disposed in the second conductive pattern layer 840 are electrically connected through the vias 831 to 835 to configure the solenoid type first coil antenna 860 wound several times in a Y-axis direction.

One end 861 and the other end 862 of the first coil antenna 860 may correspond to one end 541*a* and the other end 541*b*, respectively, of the first coil antenna 541 of FIG. 5. Alternatively, the one end 861 and the other end 862 of the first coil antenna 860 may correspond to one end 641*a* and the other end 641*b*, respectively, of the first coil antenna 641 of FIG. 6.

The intermediate layer 830 may include a core 870 (e.g., a ferromagnetic material (mu-metal)) for increasing a magnetic force generated through a solenoid coil. The core 870 may be a material having high magnetic permeability for performing a function of protecting an electronic component from a magnetic signal (e.g., the magnetic signals 791, 792, and 793 of FIG. 7) of a Z-axis direction or a passage function of a generated magnetic field. Therefore, because the core 870 may replace the shielding member 733*a* of FIG. 7, the shielding member 733*a* may be removed. Alternatively, the shielding member 733*a* may be positioned between a coil formed in the upper layer 731 and a coil formed in the lower layer 732, whereby mutual interference between the coils may be prevented.

Figure 9A:
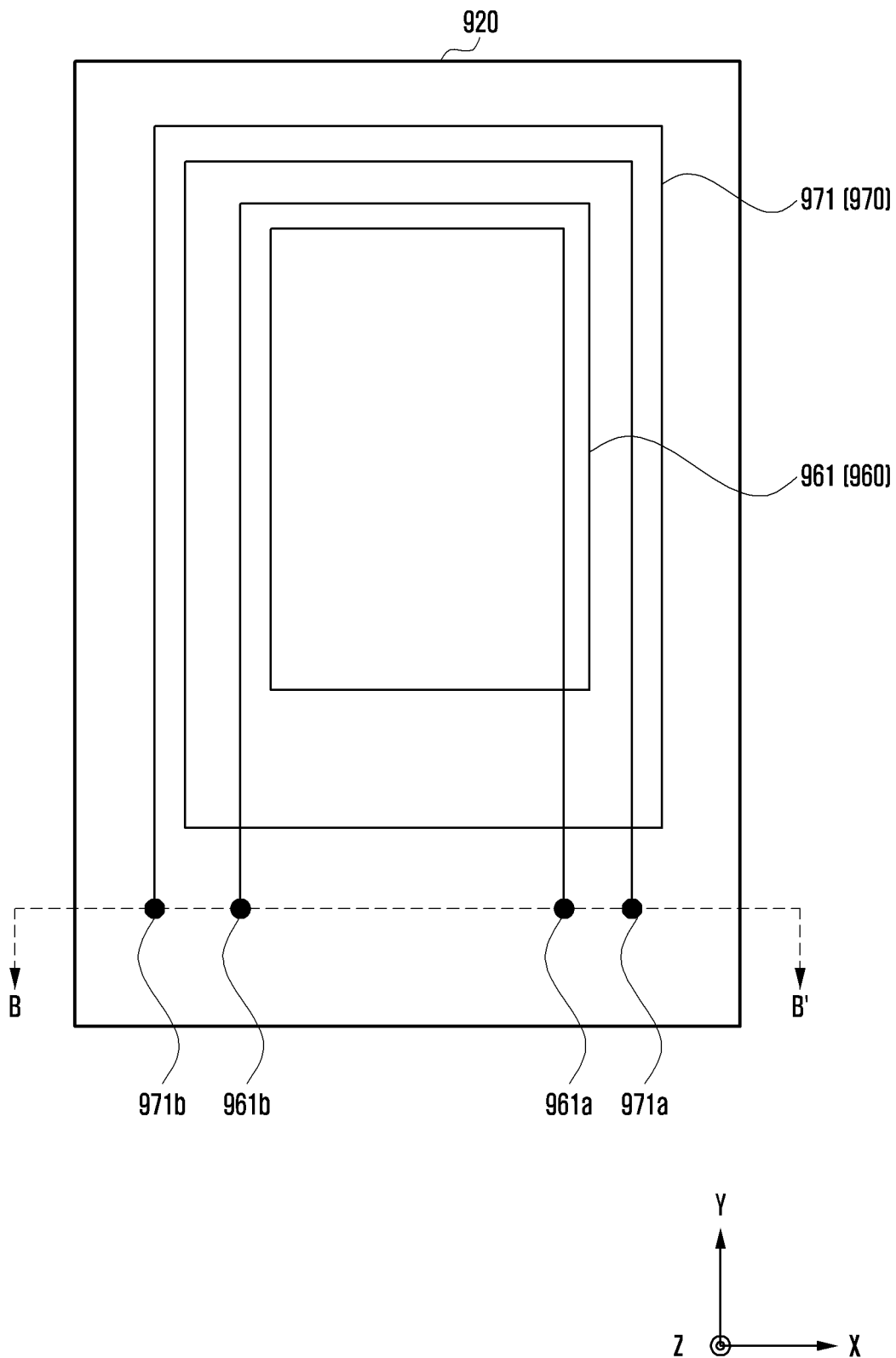
FIG. 9A is a diagram of a front surface of a first conductive pattern layer included in an upper layer of the FPCB of FIG. 7, according to an embodiment.
Figure 9B:
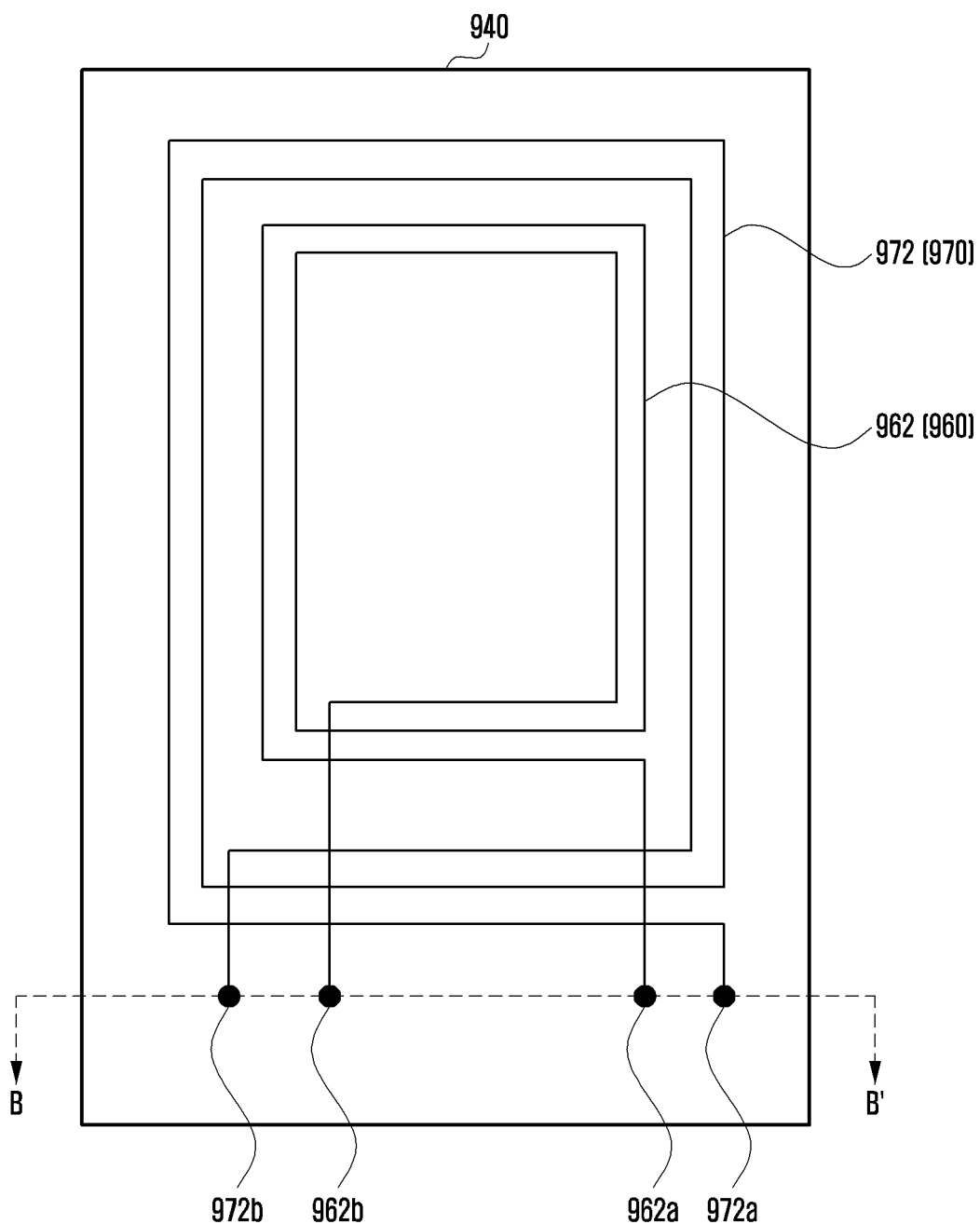
FIG. 9B is a diagram of a front surface of a second conductive pattern layer included in an upper layer of the FPCB of FIG. 7, according to an embodiment.
Figure 9C:
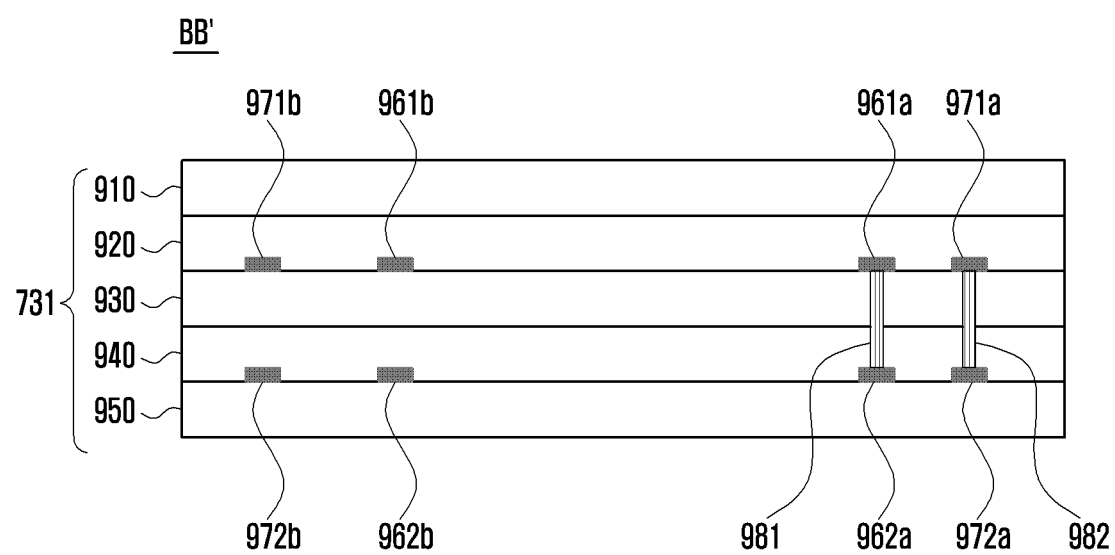
FIG. 9C is a diagram of the upper layer taken along line BB' of FIGS. 9A and 9B, according to an embodiment.
Figure 9C:
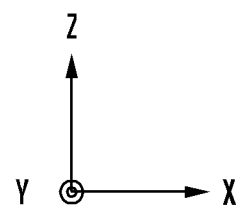

FIG. 9A is a diagram of a front surface of a first conductive pattern layer included in the upper layer 731 of the FPCB 730 of FIG. 7, according to an embodiment. FIG. 9B is a diagram of a front surface of a second conductive pattern layer included in the upper layer 731 of the FPCB 730 of FIG. 7, according to an embodiment. FIG. 9C is a diagram of the upper layer 731 taken along line BB' of FIGS. 9A and 9B, according to an embodiment.

With reference to FIGS. 9A, 9B, and 9C, the upper layer 731 may include a first protective layer (or (1-1)th layer) 910, a first conductive pattern layer (or (1-2)th layer) 920, an intermediate layer (or (1-3)th layer) 930, a second conductive pattern layer (or (1-4)th layer) 940, and a second protective layer (or (1-5)th layer) 950.

The first protective layer 910 and the second protective layer 950 are sheets for protecting a conductive pattern and a film of a non-metallic or non-conductive material may be applied to the first protective layer 910 and the second protective layer 950.

The first conductive pattern layer 920 and the second conductive pattern layer 940 may include at least one flat type coil antenna. The first conductive pattern layer 920 may include a (2-1)th coil 961 of a second coil antenna 960 (e.g., part of the second coil antenna 542 of FIG. 5 or the (2-1)th coil antenna 642-1 of FIG. 6) and a (3-1)th coil 971 (e.g., part of the third coil antenna 543 of FIG. 5 or part of the third coil antenna 643 of FIG. 6) of a third coil antenna 970 positioned outside of the (2-1)th coil 961. The second conductive pattern layer 940 may include a (2-2)th coil 962 (e.g., another part of the coil antenna 542 of FIG. 5 or a (2-2)th coil antenna 642-2 of FIG. 6) of the second coil antenna 960 wound in the same direction as a current direction of the (2-1)th coil 961 and a (3-2)th coil 972 of the third coil antenna 970 (e.g., another part of the third coil antenna 543 of FIG. 5 or another part of the third coil antenna 643 FIG. 6) positioned outside the (2-2)th coil 962 and wound in the same direction as a current direction of the (3-1)th coil 971.

The intermediate layer 930 may be an insulating sheet (e.g., PI) for electrically isolating the first conductive pattern layer 920 and the second conductive pattern layer 940 and may include a via for connecting a coil antenna formed in the first conductive pattern layer 920 and a coil antenna formed in the second conductive pattern layer 940. The intermediate layer 930 may include a first via 981 for connecting one end 961*a* of the (2-1)th coil 961 and one end 962*a* of the (2-2)th coil 962 and a second via 982 for connecting one end 971*a* of the (3-1)th coil 971 and one end 972*a* of the (3-2)th coil 972. One end 961*a* of the (2-1)th coil 961 or one end 962*a* of the (2-2)th coil 962 may correspond to the intermediate point 642*c* of the second coil antenna 642 of FIG. 6.

The other end 961*b* of the (2-1)th coil 961 and the other end 962*b* of the (2-2)th coil 962 may correspond to one end 542*a* and the other end 542*b*, respectively, of the second coil antenna 542 of FIG. 5. Alternatively, the other end 961*b* of the (2-1)th coil 961 and the other end 962*b* of the (2-2)th coil 962 may correspond to one end 642a and the other end 642b, respectively, of the second coil antenna 642 of FIG. 6.

The other end 971b of the (3-1)th coil 971 and the other end 972b of the (3-2)th coil 972 may correspond to one end 543a and the other end 543b, respectively, of the third coil antenna 543 of FIG. 5. Alternatively, the other end 971b of the (3-1)th coil 971 and the other end 972b of the (3-2)th coil 972 may correspond to one end 643a and the other end 643b, respectively, of the third coil antenna 643 of FIG. 6.

Figure 10:
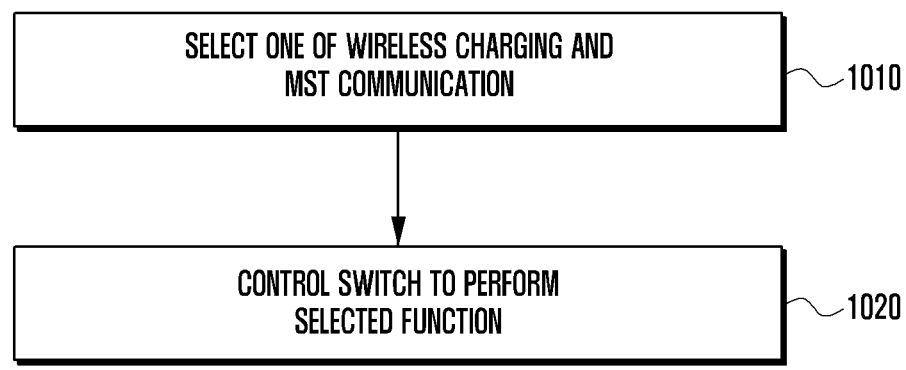
FIG. 10 is a flowchart of operations of an electronic device including a coil antenna for both MST communication and wireless charging, according to an embodiment.

FIG. 10 is a flowchart of operations of an electronic device including a coil antenna for both MST communication and wireless charging, according to an embodiment.

With reference to FIG. 10, at step 1010, a processor (e.g., the processor 120 of FIG. 1) may select a function of performing one of wireless charging and MST communication. The processor may receive a user input through an input device (e.g., the input device 150 of FIG. 1) or a touch sensitive display (e.g., the display device 160 of FIG. 1). The processor may determine which function of wireless charging and MST communication is selected by a user based on a user input. The processor may recognize through a wireless charging module (the wireless charging module 530 of FIG. 5 or the wireless charging module 630 of FIG. 6) that an external electronic device (e.g., the electronic device 102 of FIG. 1) transmits power. Thus, the processor may select wireless charging as a function to be performed. The processor may identify an external device through an interface (e.g., the interface 177 of FIG. 1), and when the identified external device is a POS device, the processor may select MST communication as a function to be performed.

At step 1020, the processor may control a switch (e.g., the switch 580 of FIG. 5 or the switch 680 of FIG. 6) to perform a selected function. When the selected function is MST communication, the processor may set the switch 580 to a closed state and control the first wireless communication module 510 to supply a current to the first coil antenna 541 and the second coil antenna 542. When the selected function is wireless charging, the processor may set the switch 580 to an open state to enable the wireless charging module 530 to receive power from an external device or to transmit power to an external device through the second coil antenna 542. When the selected function is MST communication, the processor may set the switch 680 to a closed state to control the first wireless communication module 610 to supply a current to the second coil antenna 641 and to the second coil antenna 642. When the selected function is wireless charging, the processor may set the switch 680 to an open state to enable the wireless charging module 630 to receive power from the external device or to transmit power to the external device through the (2-2)th coil antenna 642-2.

According to an embodiment, an electronic device may include a housing including a first surface facing in a first direction, a second surface facing in a second direction opposite to the first direction, and a side surface enclosing a space between the first surface and the second surface; a display (e.g., the display 301 of FIG. 3A) exposed at least partially through the first surface; a first conductive coil (e.g., the first coil antenna 541 of FIG. 5 or the first coil antenna 641 of FIG. 6) positioned inside the housing, positioned above the display when viewed from above the second surface, and having an axis substantially perpendicular to the first direction or the second direction; a second conductive coil (e.g., the second coil antenna 542 of FIG. 5 or the second coil antenna 642 of FIG. 6) and third conductive coil (e.g., the third coil antenna 543 of FIG. 5 or the third coil antenna 643 of FIG. 6) positioned inside the housing, positioned above the first conductive coil when viewed from above the second surface, and having an axis substantially horizontal to the first direction or the second direction; and a first wireless communication circuit (e.g., the first wireless communication module 510 of FIG. 5 or the first wireless communication module 610 of FIG. 6) positioned inside the housing, electrically connected to the first conductive coil and the second conductive coil, and in which the first conductive coil and the second conductive coil are configured to generate a first magnetic signal; a wireless charging circuit (e.g., the wireless charging module 530 of FIG. 5 or the wireless charging module 630 of FIG. 6) positioned inside the housing, electrically connected to the second conductive coil, and in which the second conductive coil is configured to generate or receive a second magnetic signal; and a second wireless communication circuit (the second wireless communication circuit 520 of FIG. 5 or the second wireless communication circuit 620 of FIG. 6) positioned inside the housing, electrically connected to the third conductive coil, and in which the third conductive coil is configured to generate or receive a third magnetic signal.

The electronic device may further include an FPCB (e.g., the FPCB 570 of FIG. 5, the FPCB 670 of FIG. 6, or the FPCB 730 of FIG. 7), where the FPCB may include an upper layer, a lower layer positioned below the upper layer when viewed from above the second surface, and an intermediate layer positioned between the upper layer and the lower layer, and in the upper layer, the second conductive coil and the third conductive coil may be formed, and in the lower layer, the first conductive coil may be formed.

One end of the first conductive coil (e.g., the first coil antenna 541 of FIG. 5) may be electrically connected to a first electrode of the first wireless communication circuit, the other end of the first conductive coil may be electrically connected to one end of the second conductive coil (e.g., the second coil antenna 542 of FIG. 5) and a first electrode of the wireless charging circuit, the other end of a second conductive coil may be electrically connected to a second electrode of the first wireless communication circuit and a second electrode of the wireless charging circuit, one end of the third conductive coil (e.g., the third coil antenna 543 of FIG. 5) may be electrically connected to a first electrode of the second wireless communication circuit, the other end of the third conductive coil may be electrically connected to a second electrode of the second wireless communication circuit, and the intermediate layer may include a first via for connecting the other end of the first conductive coil and one end of the second conductive coil. The intermediate layer may further include a second via electrically connected to the one end of the first conductive coil, and the first electrode of the first wireless communication circuit may be electrically connected to the one end of the first conductive coil through the second via.

One end of the first conductive coil (e.g., the first coil antenna 641 of FIG. 6) may be electrically connected to a first electrode of the first wireless communication circuit, the other end of the first conductive coil may be electrically connected to one point (e.g., the intermediate point 642c of FIG. 6) of the second conductive coil (e.g., the second coil antenna 642 of FIG. 6) and a second electrode of the wireless charging circuit, one end of the second conductive coil may be electrically connected to the first electrode of the first wireless communication circuit, the other end of the second conductive coil may be electrically connected to a second electrode of the first wireless communication circuit and a first electrode of the wireless charging circuit, one end of the third conductive coil (e.g., the third coil antenna 643 of FIG. 6) may be electrically connected to a first electrode of the second wireless communication circuit, the other end of the third conductive coil may be electrically connected to a second electrode of the second wireless communication circuit, and the intermediate layer may include a first via configured to connect the other end of the first conductive coil and the point of the second conductive coil. The intermediate layer may further include a second via electrically connected to the one end of the first conductive coil. The first electrode of the first wireless communication circuit may be electrically connected to the one end of the first conductive coil through the second via. The electronic device may further include a switch configured to connect or disconnect the first electrode of the first wireless communication circuit to the one end of the first conductive coil and to connect or disconnect the second electrode of the first wireless communication circuit to the other end of the second conductive coil.

In the intermediate layer, a shield sheet may be formed.

The lower layer may include a first layer (e.g., the first conductive pattern layer 820 of FIG. 8), a second layer (e.g., the second conductive pattern layer 840 of FIG. 8), and an intermediate layer (e.g., the intermediate layer 830 of FIG. 8) between the first layer and the second layer. The first layer may include a first plurality of wiring lines forming part of the first conductive coil. The second layer may include a second plurality of wiring lines configured to form the other part of the first conductive coil. The intermediate layer may include a plurality of vias configured to electrically connect between the first plurality of wiring lines and the second plurality of wiring lines. The intermediate layer may include a core configured to increase a magnetic force generated through the first conductive coil.

The upper layer may include a first layer (e.g., the first conductive pattern layer 920 of FIG. 9), a second layer (e.g., the second conductive pattern layer 940 of FIG. 9), and an intermediate layer (e.g., the intermediate layer 930 of FIG. 9) between the first layer and the second layer. The second conductive coil may include a (2-1)th conductive coil formed in the first layer and a (2-2)th conductive coil formed in the second layer. The intermediate layer may include a first via for connecting one end of the (2-1)th conductive coil and one end of the (2-2)th conductive coil. One end of the first conductive coil (e.g., the first coil antenna 541 of FIG. 5) may be electrically connected to a first electrode of the first wireless communication circuit, the other end of the first conductive coil may be electrically connected to the other end of the (2-1)th conductive coil and the first electrode of the wireless charging circuit, the other end of the (2-2)th conductive coil may be electrically connected to a second electrode of the first wireless communication circuit and a second electrode of the wireless charging circuit, one end of the third conductive coil (e.g., the third coil antenna 543 of FIG. 5) may be electrically connected to a first electrode of the second wireless communication circuit, the other end of the third conductive coil may be electrically connected to a second electrode of the second wireless communication circuit, and the intermediate layer may include a via for connecting the other end of the first conductive coil and the one end of the second conductive coil. One end of the first conductive coil (e.g., the first coil antenna 641 of FIG. 6) may be electrically connected to a first electrode of the first wireless communication circuit, the other end of the first conductive coil may be electrically connected to the one end of the (2-1)th conductive coil and a second electrode of the wireless charging circuit, the other end of the (2-1)th conductive coil may be electrically connected to the first electrode of the first wireless communication circuit, the other end of the (2-2)th conductive coil may be electrically connected to a second electrode of the first wireless communication circuit and a first electrode of the wireless charging circuit, one end of the three conductive coil (e.g., the third coil antenna 643 of FIG. 6) may be electrically connected to a first electrode of the second wireless communication circuit, the other end of the third conductive coil may be electrically connected to a second electrode of the second wireless communication circuit, and the intermediate layer may include a via for connecting the other end of the first conductive coil and the point of the second conductive coil.

The third conductive coil may include a (3-1)th conductive coil formed in the first layer and a (3-2)th conductive coil formed in the second layer, and the intermediate layer may further include a second via for connecting one end of the (3-1)th conductive coil and one end of the (3-2)th conductive coil.

When viewed from above the second surface, the (3-1)th conductive coil may be positioned in the first layer in the form enclosing the (2-1)th conductive coil, and the (3-2)th conductive coil may be positioned in the second layer in the form enclosing the (2-2)th conductive coil.

The other end of the (3-1)th conductive coil may be electrically connected to a first electrode of the second wireless communication circuit, and the other end of the (3-2)th conductive coil may be electrically connected to a second electrode of the second wireless communication circuit.

The electronic device may further include a PCB (e.g., the PCB 760 of FIG. 7) positioned below the FPCB when viewed from above the second surface and in which the first wireless communication circuit, the wireless charging circuit, and the second wireless communication circuit are mounted; and a structure (e.g., the second FPCB 750 of FIG. 7) for electrically connecting the upper layer to the PCB. The intermediate layer may include a first via and a second via, and one end of the first conductive coil (e.g., the first coil antenna 541 of FIG. 5) may be electrically connected to a first electrode of the first wireless communication circuit through the second via and the structure, the other end of the first conductive coil may be electrically connected to one end of the second conductive coil (e.g., the second coil antenna 542 of FIG. 5) through the first via, the other end of the first conductive coil may be electrically connected to a first electrode of the wireless charging circuit through the first via and the structure, the other end of the second conductive coil may be electrically connected to a second electrode of the first wireless communication circuit and a second electrode of the wireless charging circuit through the structure, one end of the third conductive coil (e.g., the third coil antenna 543 of FIG. 5) may be electrically connected to a first electrode of the second wireless communication circuit through the structure, and the other end of the third conductive coil may be electrically connected to a second electrode of the second wireless communication circuit through the structure.

The electronic device may further include a PCB (e.g., the PCB 760 of FIG. 7) positioned below the FPCB when viewed from above the second surface and in which the first wireless communication circuit, the wireless charging circuit, and the second wireless communication circuit are mounted; and a structure (e.g., the FPCB 750 of FIG. 7) configured to electrically connect the upper layer to the PCB. The intermediate layer may include a first via and a second via, and one end of the first conductive coil (e.g., the first coil antenna 641 of FIG. 6) may be electrically connected to a first electrode of the first wireless communication circuit through the second via and the structure, the other end of the first conductive coil may be electrically connected to one point of the second conductive coil through the first via, the other end of the first the conductive coil may be electrically connected to a second electrode of the wireless charging circuit through the first via and the structure, one end of the second conductive coil (e.g., the second coil antenna 642 of FIG. 6) may be electrically connected to the first electrode of the first wireless communication circuit through the structure, the other end of the second conductive coil may be electrically connected to a second electrode of the first wireless communication circuit and a first electrode of the wireless charging circuit through the structure, one end of the third conductive coil (e.g., the third coil antenna 643 of FIG. 6) may be electrically connected to a first electrode of the second wireless communication circuit through the structure, and the other end of the third conductive coil may be electrically connected to a second electrode of the second wireless communication circuit through the structure.

The first wireless communication circuit may include an MST communication circuit, and the second wireless communication circuit may include an NFC circuit.

According to an embodiment, an electronic device may include a housing including a first surface facing in a first direction, a second surface facing in a second direction opposite to the first direction, and a side surface enclosing a space between the first surface and the second surface; a display at least partially exposed through the first surface, an FPCB positioned inside the housing, positioned above the display when viewed from above the second surface, and including a first conductive coil and a second conductive coil, a wireless communication circuit positioned inside the housing, electrically connected to the first conductive coil and the second conductive coil, and in which the first conductive coil and the second conductive coil are configured to generate a first magnetic signal, and a wireless charging circuit positioned inside the housing, electrically connected to the second conductive coil, and in which the second conductive coil is configured to generate or receive a second magnetic signal. The FPCB may include an upper layer and a lower layer positioned below the upper layer when viewed from above the second surface. In the upper layer, the second conductive coil may be formed, and in the lower layer, the first conductive coil may be formed.

Antennas can be disposed in an internal space of an electronic device in a multilayer structure and share part of a radiating body. Accordingly, an overall size of the antennas can be reduced, and an internal space of the electronic device can be somewhat free from restriction. Further, antennas may be configured to emit magnetic signals in various directions. Thus, the electronic device can exhibit a stable radiation performance.

The embodiments disclosed in this specification and drawings only present a specific example in order to easily describe the technical contents and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

What is claimed is:

1. An electronic device, comprising:
   a housing comprising a first surface facing in a first direction, a second surface facing in a second direction opposite to the first direction, and a side surface enclosing a space between the first surface and the second surface;
   a display exposed at least partially through the first surface;
   a first conductive coil positioned inside the housing, positioned above the display when viewed from above the second surface, and having an axis substantially perpendicular to the first direction or the second direction;
   a second conductive coil and a third conductive coil positioned inside the housing, positioned above the first conductive coil when viewed from above the second surface, and having an axis substantially horizontal to the first direction or the second direction;
   a first wireless communication circuit positioned inside the housing, electrically connected to the first conductive coil and the second conductive coil, and in which the first conductive coil and the second conductive coil are configured to generate a first magnetic signal;
   a wireless charging circuit positioned inside the housing, electrically connected to the second conductive coil, and in which the second conductive coil is configured to generate or receive a second magnetic signal;
   a second wireless communication circuit positioned inside the housing, electrically connected to the third conductive coil, and in which the third conductive coil is configured to generate or receive a third magnetic signal; and
   a flexible printed circuit board (FPCB) comprising:
   an upper layer in which the second conductive coil and the third conductive coil are formed, and
   a lower layer positioned below the upper layer in which the first conductive coil is formed,
   wherein the upper layer comprises a first layer, a second layer, and a third later between the first layer and the second layer,
   wherein the second conductive coil comprises a fourth conductive coil formed in the first layer and a fifth conductive coil formed in the second layer, and
   wherein the third layer comprises a first via configured to connect one end of the fourth conductive coil and one end of the fifth conductive coil.

2. The electronic device of claim 1,
   wherein the FPCB further comprises:
   an intermediate layer positioned between the upper layer and the lower layer.

3. The electronic device of claim 2, wherein one end of the first conductive coil is electrically connected to a first electrode of the first wireless communication circuit,
   wherein the other end of the first conductive coil is electrically connected to one end of the second conductive coil and a first electrode of the wireless charging circuit,
   wherein the other end of the second conductive coil is electrically connected to a second electrode of the first wireless communication circuit and a second electrode of the wireless charging circuit,
   wherein one end of the third conductive coil is electrically connected to a first electrode of the second wireless communication circuit, wherein the other end of the third conductive coil is electrically connected to a second electrode of the second wireless communication circuit, and wherein the intermediate layer comprises a first via configured to connect the other end of the first conductive coil and the one end of the second conductive coil.

4. The electronic device of claim 3, wherein the intermediate layer further comprises a second via electrically connected to the one end of the first conductive coil, and wherein the first electrode of the first wireless communication circuit is electrically connected to the one end of the first conductive coil through the second via.

5. The electronic device of claim 2, wherein one end of the first conductive coil is electrically connected to a first electrode of the first wireless communication circuit, wherein the other end of the first conductive coil is electrically connected to one point of the second conductive coil and a second electrode of the wireless charging circuit, wherein one end of the second conductive coil is electrically connected to the first electrode of the first wireless communication circuit, wherein the other end of the second conductive coil is electrically connected to a second electrode of the first wireless communication circuit and a first electrode of the wireless charging circuit, wherein one end of the third conductive coil is electrically connected to a first electrode of the second wireless communication circuit, wherein the other end of the third conductive coil is electrically connected to a second electrode of the second wireless communication circuit, and wherein the intermediate layer comprises a first via configured to connect the other end of the first conductive coil and the point of the second conductive coil.

6. The electronic device of claim 5, wherein the intermediate layer further comprises a second via electrically connected to the one end of the first conductive coil, and wherein the first electrode of the first wireless communication circuit is electrically connected to the one end of the first conductive coil through the second via.

7. The electronic device of claim 5, further comprising a switch configured to connect or disconnect the first electrode of the first wireless communication circuit to the one end of the first conductive coil and to connect or disconnect the second electrode of the first wireless communication circuit to the other end of the second conductive coil.

8. The electronic device of claim 2, wherein a shield sheet is formed in the intermediate layer.

9. The electronic device of claim 2, further comprising:
a printed circuit board (PCB) positioned below the FPCB when viewed from above the second surface and in which the first wireless communication circuit, the wireless charging circuit, and the second wireless communication circuit are mounted; and
a structure configured to electrically connect the upper layer to the PCB,
wherein the intermediate layer comprises a first via and a second via,
wherein one end of the first conductive coil is electrically connected to a first electrode of the first wireless communication circuit through the second via and the structure,
wherein the other end of the first conductive coil is electrically connected to one end of the second conductive coil through the first via,
wherein the other end of the first conductive coil is electrically connected to a first electrode of the wireless charging circuit through the first via and the structure,
wherein the other end of the second conductive coil is electrically connected to a second electrode of the first wireless communication circuit and a second electrode of the wireless charging circuit through the structure,
wherein one end of the third conductive coil is electrically connected to a first electrode of the second wireless communication circuit through the structure, and
wherein the other end of the third conductive coil is electrically connected to a second electrode of the second wireless communication circuit through the structure.

10. The electronic device of claim 2, further comprising:
a printed circuit board (PCB) positioned below the FPCB when viewed from above the second surface and in which the first wireless communication circuit, the wireless charging circuit, and the second wireless communication circuit are mounted; and
a structure configured to electrically connect the upper layer to the PCB,
wherein the intermediate layer comprises a first via and a second via,
wherein one end of the first conductive coil is electrically connected to a first electrode of the first wireless communication circuit through the second via and the structure,
wherein the other end of the first conductive coil is electrically connected to one point of the second conductive coil through the first via,
wherein the other end of the first conductive coil is electrically connected to a second electrode of the wireless charging circuit through the first via and the structure,
wherein one end of the second conductive coil is electrically connected to the first electrode of the first wireless communication circuit through the structure,
wherein the other end of the second conductive coil is electrically connected to a second electrode of the first wireless communication circuit and a first electrode of the wireless charging circuit through the structure,
wherein one end of the third conductive coil is electrically connected to a first electrode of the second wireless communication circuit through the structure, and
wherein the other end of the third conductive coil is electrically connected to a second electrode of the second wireless communication circuit through the structure.

11. The electronic device of claim 1, wherein the lower layer comprises a first layer, a second layer, and an third layer between the first layer and the second layer,
wherein the first layer comprises a first plurality of wiring lines forming part of the first conductive coil,
wherein the second layer comprises a second plurality of wiring lines configured to form the other part of the first conductive coil, and
wherein the third layer of the lower layer comprises a plurality of vias configured to electrically connect between the first plurality of wiring lines and the second plurality of wiring lines.

12. The electronic device of claim 11, wherein the third layer of the lower layer comprises a core configured to increase a magnetic force generated through the first conductive coil.

13. The electronic device of claim 1, wherein one end of the first conductive coil is electrically connected to a first electrode of the first wireless communication circuit,
wherein the other end of the first conductive coil is electrically connected to the other end of the fourth conductive coil and a first electrode of the wireless charging circuit,
wherein the other end of the fifth conductive coil is electrically connected to a second electrode of the first wireless communication circuit and a second electrode of the first wireless charging circuit,
wherein one end of the third conductive coil is electrically connected to a first electrode of the second wireless communication circuit,
wherein the other end of the third conductive coil is electrically connected to a second electrode of the second wireless communication circuit, and
wherein the third layer comprises a via configured to connect the other end of the first conductive coil and one end of the second conductive coil.

14. The electronic device of claim 1, wherein one end of the first conductive coil is electrically connected to a first electrode of the first wireless communication circuit,
wherein the other end of the first conductive coil is electrically connected to the one end of the fourth conductive coil and a second electrode of the wireless charging circuit,
wherein the other end of the fourth conductive coil is electrically connected to the first electrode of the first wireless communication circuit,
wherein the other end of the fifth conductive coil is electrically connected to a second electrode of the first wireless communication circuit and a first electrode of the wireless charging circuit,
wherein one end of the third conductive coil is electrically connected to a first electrode of the second wireless communication circuit,
wherein the other end of the third conductive coil is electrically connected to a second electrode of the second wireless communication circuit, and
wherein the third layer comprises a via configured to connect the other end of the first conductive coil and the point of the second conductive coil.

15. The electronic device of claim 1, wherein the third conductive coil comprises a (3-1)th conductive coil formed in the first layer and a (3-2)th conductive coil formed in the second layer, and
wherein the third layer further comprises a second via configured to connect one end of the (3-1)th conductive coil and one end of the (3-2)th conductive coil.

16. The electronic device of claim 15, wherein, when viewed from above the second surface, the (3-1)th conductive coil is positioned in the first layer in the form enclosing the fourth conductive coil, and the (3-2)th conductive coil is positioned in the second layer in the form of enclosing the fifth conductive coil.

17. The electronic device of claim 15, wherein the other end of the (3-1)th conductive coil is electrically connected to a first electrode of the second wireless communication circuit, and the other end of the (3-2)th conductive coil is electrically connected to a second electrode of the second wireless communication circuit.

18. The electronic device of claim 1, wherein the first wireless communication circuit comprises a magnetic secure transmission (MST) communication circuit, and the second wireless communication circuit comprises a near field communication (NFC) circuit.

19. An electronic device, comprising:
a housing comprising a first surface facing in a first direction, a second surface facing in a second direction opposite to the first direction, and a side surface enclosing a space between the first surface and the second surface;
a display at least partially exposed through the first surface;
a flexible printed circuit board (FPCB) positioned inside the housing, positioned above the display when viewed from above the second surface, and comprising a first conductive coil and a second conductive coil;
a wireless communication circuit positioned inside the housing, electrically connected to the first conductive coil and the second conductive coil, and in which the first conductive coil and the second conductive coil are configured to generate a first magnetic signal; and
a wireless charging circuit positioned inside the housing, electrically connected to the second conductive coil, and in which the second conductive coil is configured to generate or receive a second magnetic signal,
wherein the FPCB comprises an upper layer and a lower layer positioned below the upper layer when viewed from above the second surface,
wherein the second conductive coil is formed in the upper layer, and
wherein the first conductive coil is formed in the lower layer,
wherein the upper layer comprises a first layer, a second layer, and a third layer between the first layer and the second layer,
wherein the second conductive coil comprises a fourth conductive coil formed in the first layer and a fifth conductive coil formed in the second layer, and
wherein the third layer comprises a first via configured to connect one end of the fourth conductive coil and one end of the fifth conductive coil.

* * * * *